United States Patent [19]

Eilert et al.

[11] Patent Number: 5,675,739
[45] Date of Patent: Oct. 7, 1997

[54] APPARATUS AND METHOD FOR MANAGING A DISTRIBUTED DATA PROCESSING SYSTEM WORKLOAD ACCORDING TO A PLURALITY OF DISTINCT PROCESSING GOAL TYPES

[75] Inventors: Catherine Krueger Eilert; Peter Bergersen Yocom, both of Wappingers Falls, N.Y.

[73] Assignee: International Business Machines Corporation, Armonk, N.Y.

[21] Appl. No.: 383,168

[22] Filed: Feb. 3, 1995

[51] Int. Cl.⁶ .................................................. G06F 13/00
[52] U.S. Cl. .................. 395/200.11; 395/200.03; 395/180.01; 395/671; 395/672
[58] Field of Search .................................. 395/650, 700, 395/670, 671, 672, 675, 180.01, 200.03, 200.11

[56] References Cited

U.S. PATENT DOCUMENTS

| 4,914,570 | 4/1990 | Peacock | 364/200 |
|---|---|---|---|
| 5,031,089 | 7/1991 | Liu et al. | 364/200 |
| 5,109,486 | 4/1992 | Seymour | 395/200 |

OTHER PUBLICATIONS

Silverman et al, "A Distributed System for Parallel Processing", Software Practice and Experience, vol. 19(12), 1163–1174, Dec. 1989.
Shivaratri et al, "Load Distributed for Locally Distributed Systems", IEEE Computer, Dec. 1992, pp. 33–44.

Primary Examiner—Kevin A. Kriess
Assistant Examiner—Michael T. Richey
Attorney, Agent, or Firm—Lawrence D. Cutter; Heslin & Rothenberg, P.C.

[57] ABSTRACT

An apparatus for managing a workload distributed across data processing systems in accordance with a common performance standard, which includes a means for measuring the performance of the work units to create local performance data; a means for sending said local performance data to at least one other system; a means for receiving performance data from at least one other system to create remote performance data; and a means responsive to said local and remote performance data for adjusting at least one of the system control parameters to modify the performance of the work units on the system to achieve the common performance standard, is disclosed. Also disclosed is a method for managing workload as represented by the apparatus.

42 Claims, 17 Drawing Sheets

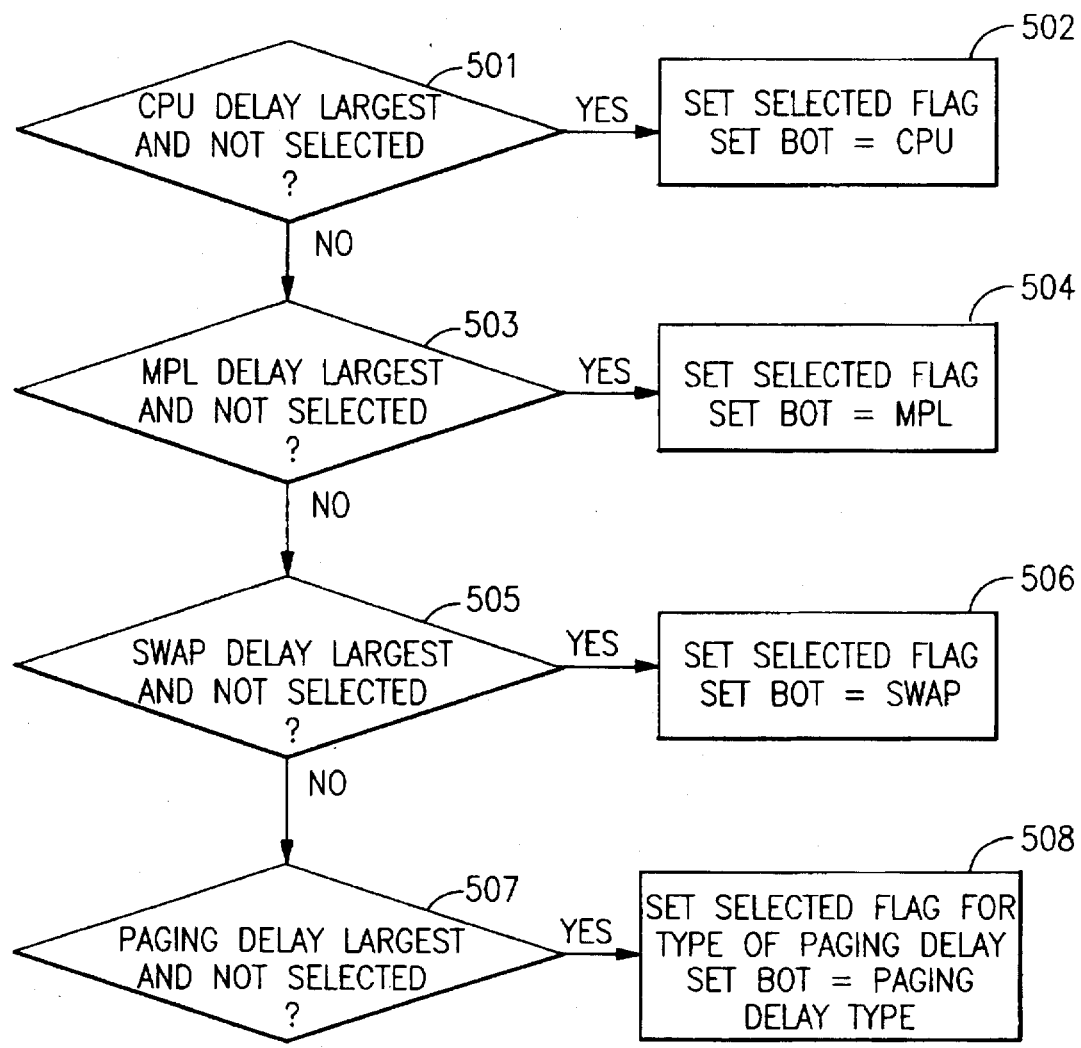

```
 1    < 0.500 * GOAL
 2    < 0.575 * GOAL
 3    < 0.650 * GOAL
 4    < 0.725 * GOAL
 .
 .
 .
21    < 2.00 * GOAL
22    < 2.50 * GOAL
23    < 3.00 * GOAL
 .
 .
 .
27    < 5.00 * GOAL
28    > 5.00 * GOAL
```

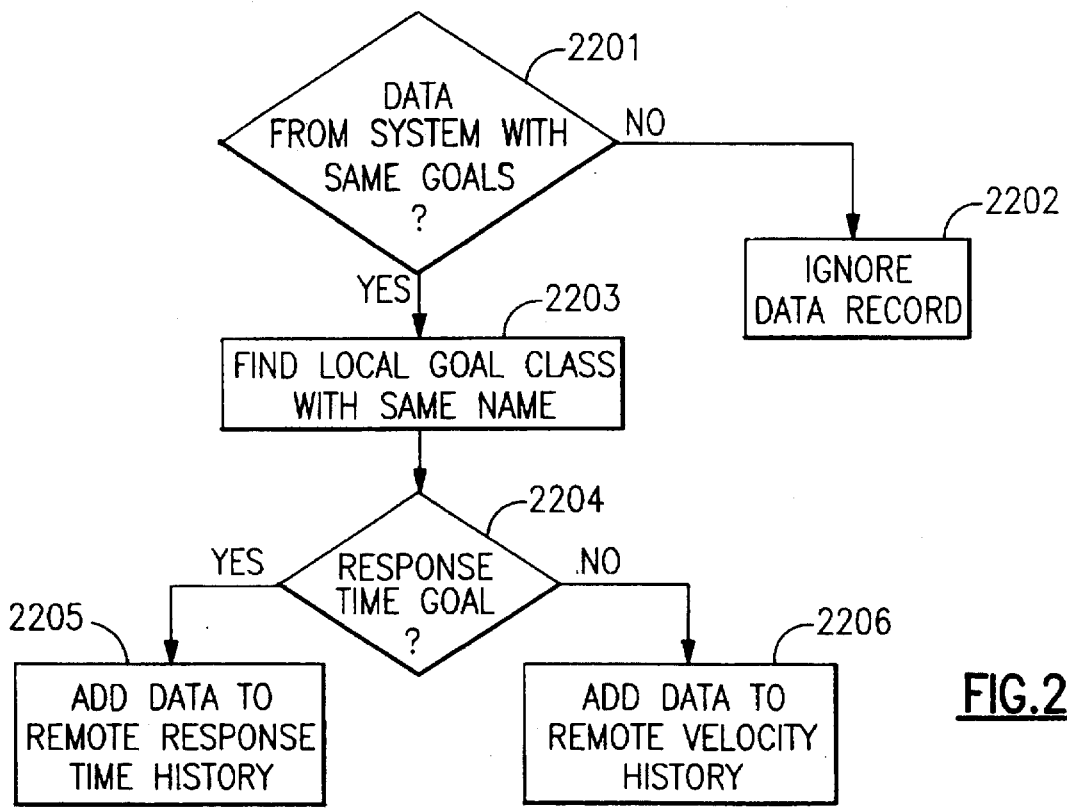
FIG.22
DATA SENT FOR GOAL CLASS
WITH A RESPONSE TIME GOAL:
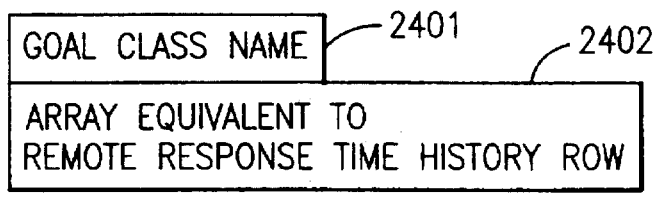
DATA SENT FOR GOAL CLASS
WITH A VELOCITY GOAL:
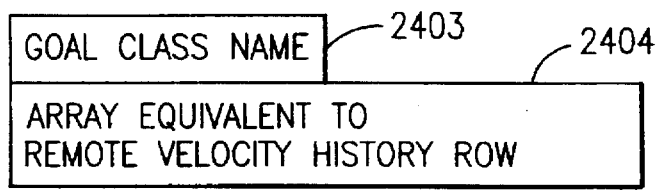
FIG.24

APPARATUS AND METHOD FOR MANAGING A DISTRIBUTED DATA PROCESSING SYSTEM WORKLOAD ACCORDING TO A PLURALITY OF DISTINCT PROCESSING GOAL TYPES

INTRODUCTION

The present invention relates to managing the performance of user application program execution across a set of interconnected, cooperating, independent computer systems.

The user application programs do the useful work that is the purpose of the computer systems. These application programs form the units of work whose execution is managed by the computer's operating system software. These application programs are said to form a distributed workload in the sense that they are independent programs that are dispersed across the set of systems for execution, while sharing a common set of performance goals.

These computer systems are said to be independent in the sense that each is an entirely separate, wholly functional computer system whose resources are controlled by it's own copy of an operating system, such as IBM's Multiple Virtual Storage/Enterprise Systems Architecture (MVS/ESA)™ operating system. These computer systems are said to be cooperating in the sense that each is exchanging operational measurement data with the other computer systems in the set. These computer systems are said to be interconnected in the sense that each is able to transmit its operational measurement data to all the other systems in the set and to receive the analogous data from those other systems in the set. These computer systems comprise a set in the sense that they all have the characteristics cited above.

The present invention relates to managing performance in the sense that the operating system is adapted to establish a performance goal class for each distinct performance goal established for the set of systems; classifying each application program, in whichever system or systems of the set a given application program is to be executed, into its respective goal class as a part of scheduling the application program for execution; controlling the execution of the application programs so that the application programs that are assigned to a given goal class do meet the performance goal across all the systems, taken as a set.

BACKGROUND OF THE INVENTION

Management of computer system performance has reached the point where the existing process controls are inadequate. The primary problem is one of complexity, given the large number of interrelated factors that affect actual achieved performance. Complexity is also significantly increased when the workload to be managed is distributed across multiple independent systems. In a single system, the invention disclosed in U.S. patent application Ser. No. 08/222,755, "APPARATUS AND METHOD FOR MANAGING A DATA PROCESSING SYSTEM WORKLOAD ACCORDING TO TWO OR MORE DISTINCT PROCESSING GOAL TYPES" by J. D. Aman et al. (Aman), filed Apr. 4, 1994 and assigned to the assignee of the present invention, simplifies workload management by allowing management of work units according to end-user oriented goals. This application is incorporated by reference hereby.

Current operating system software is not able to take over the responsibility for managing the performance of a workload that is distributed across a plurality of interconnected, cooperating computer systems according to end-user oriented goals specified for that set of computer systems taken as a group.

SUMMARY OF THE INVENTION

The present invention allows specification of a performance goal for each of a plurality of user performance goal classes for a workload that is distributed across a plurality of interconnected, cooperating but independent computer systems. Exemplary goals may be specified in terms of response time or execution velocity. The relative importance of achieving a goal may also be specified with each goal. Given a common awareness of the user performance goals, the operating system on each system being managed takes on responsibility for the allocation of its system resources to executing work units such that those goals are best achieved across the set of computer systems being managed. Tradeoffs are made to best utilize the available capacity, based on actual achievement toward goals and the types of computer system resources required to achieve those goals.

BRIEF DESCRIPTION OF THE DRAWINGS

The detailed description explains the preferred embodiments of the present invention, together with advantages and features, by way of example with reference to the following drawings.

FIG. 4 illustrates the state data used to select resource bottlenecks.

FIG. 5 is a flowchart showing logic flow for the find-bottleneck function.

FIG. 22 is a flow chart of the steps taken by the remote data receiver.

FIG. 24 shows the data sent to the remote systems for both response-time type performance goal classes and for execution-velocity type performance goal classes.

DETAILED DESCRIPTION OF THE INVENTION

Figure 1:
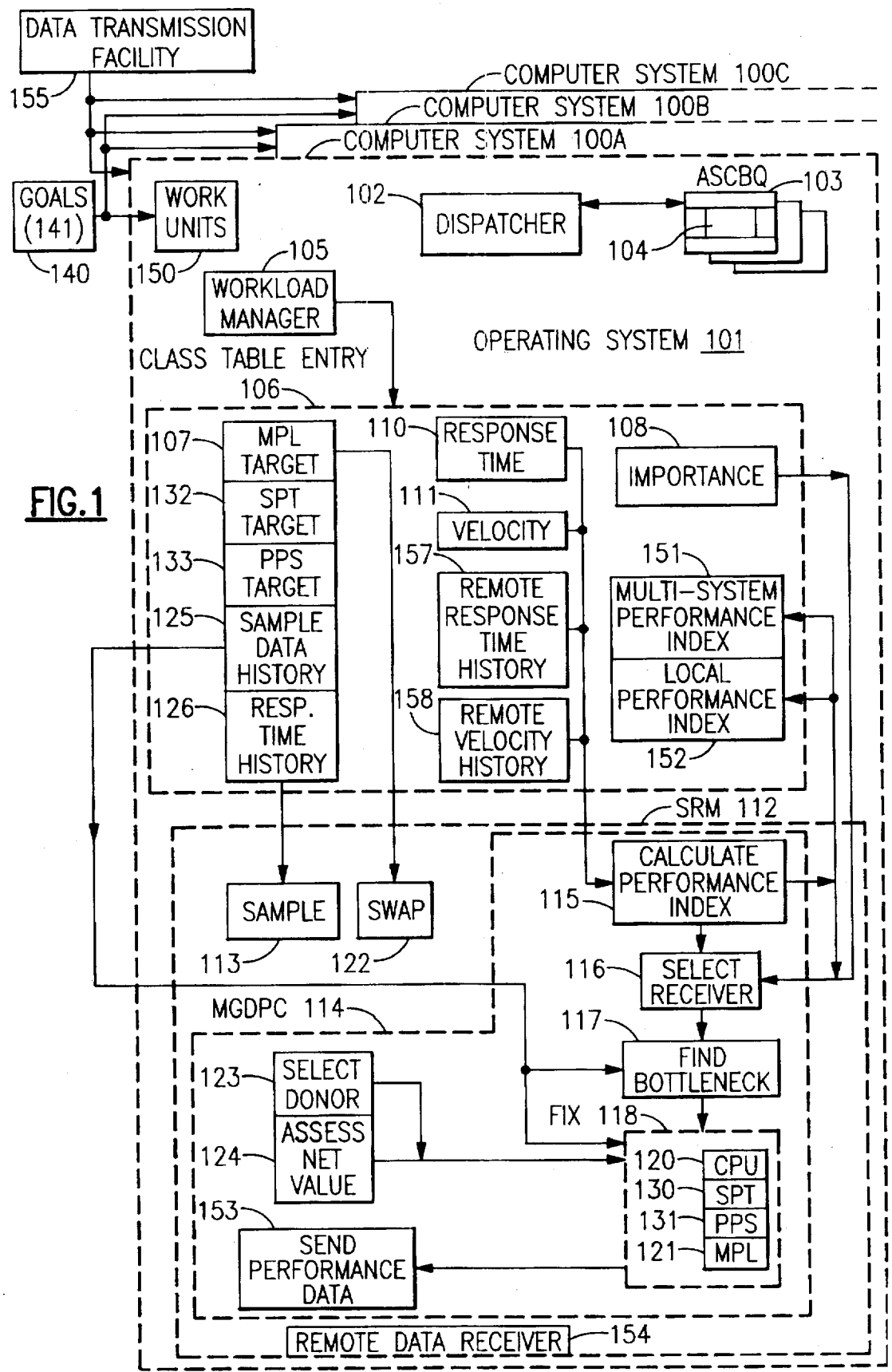
FIG. 1 is a system structure diagram showing particularly a set of computer systems, each having a controlling operating system and system resource manager component adapted as described for the present invention.

FIG. 1 illustrates the environment and the key features of the present invention for an exemplary embodiment having three interconnected, cooperating computer systems. The environment of this invention is that of a workload being distributed across a set of computer systems. This invention allows management of such a workload through a single policy for the set of systems. Having a single policy for the set of systems helps provide a single-image view of the distributed workload. Those skilled in the art will recognize that any number of such interconnected, cooperating computer systems may be used without departing from the spirit or scope of this invention. The three computer systems (100-A, 100-B, 100-C) are executing a distributed workload, and each is controlled by its own copy of an operating system (101) such as IBM's MVS/ESA™.

Each of these copies of the operating system executes the steps described in this specification. When the description below refers to the local system, it means the system that is executing the steps being described. The remote systems are all the other systems being managed. Note that each system considers itself local and all other systems remote.

A dispatcher (102) is a component of the operating system that selects the unit of work to be executed next by the computer. The units of work (150) are the application programs that do the useful work that is the purpose of the computer system. The units of work that are ready to be executed are represented by a chain of control blocks in the operating system memory called the address space control block (ASCB) queue (103). Each ASCB has a field that contains a relative importance (dispatching priority) value (104). The dispatching priority is set by operation of the present invention and used by the dispatcher to select to be executed the highest priority unit of work from those that are ready to be executed, as determined by the ASCB queue. The dispatching priority is a controlled variable provided by the present invention for meeting the stated performance goals for computer system operation.

The present invention takes as input the performance goals established by a system administrator and stored (141) on a data storage facility (140). The goals apply to work across all the systems being managed (100-A, 100-B, 100-C). The data storage facility (140) is accessible by each system being managed. The performance goals illustrated here are of two types: response time (in seconds) and execution velocity (in percent). Those skilled in the art will recognize that other goals, or additional goals, may be chosen without departing from the spirit or scope of this invention. Included with the performance goals is the specification of the relative importance of each goal. The goals (141) are read into each system by a workload manager (WLM) component (105) of the operating system on each of the systems being managed. Each of the goals, which were established and specified by the system administrator, causes the workload manager on each system to establish a performance class to which individual work units will be assigned. Each performance class is represented in the memory of the operating systems by a class table entry (106). The specified goals (in an internal representation) and other information relating to the performance class are recorded in the class table entry. Other information stored in a class-table entry includes the multiprogramming level (MPL) target value (107) (a controlled variable), the relative importance of the goal class (108) (an input value), the multi-system performance index (151), the local performance index (152) (computed values), the response time goal (110) (an input value), the execution velocity goal (111) (an input value), sample data (125) (measured data), the remote response time history (157) (measured data), the remote velocity history (158) (measured data), the sample data history (125) (measured data), and the response time history (126) (measured data).

The goal driven performance controller of the system resource manager (SRM) component (112) of the operating system (Aman) is modified according to the present invention to be a multi-system goal-driven performance-controller (MGDPC) component (114) and to operate in the following manner as shown in FIG. 1. The MGDPC performs the functions of measuring the achievement of goals, selecting the user performance goal classes that need their performance improved, and improving the performance of the user performance goal classes selected by modifying the controlled variables of the associated work units, as described later. The MGDPC function is performed periodically based on a periodic timer expiration approximately every ten seconds in the preferred embodiment.

At (115), a multi-system performance index and a local performance index are calculated for each user performance goal class (106) using the specified goal (110 or 111). The multi-system performance index represents the performance of work units associated with the goal class, across all the systems being managed. The local performance index represents the performance of work units associated with the goal class on the local system. The resulting performance indexes are recorded in the corresponding class table entry (106) at (151) and (152). The concept of a performance index as a method of measuring user performance goal achievement is well known. For example, in U.S. patent application Ser. No. 07/876,670, "Workload Manager for Achieving Transaction Class Response Time Goals in a Multiprocessing System", by D. Ferguson, et al., filed Apr. 30, 1992 and assigned to the assignee of the present invention, the performance index is described as the actual response time divided by the goal response time. This application is incorporated by reference hereby.

At (116), a user performance goal class is selected to receive a performance improvement in the order of the relative goal importance (108) and the current value of the performance indexes (151,152). The selected user performance goal class is referred to as the receiver. The MGDPC first uses the multi-system performance index when choosing a receiver so that the action it takes has the largest possible impact on causing work units to meet goals across all the systems being managed. When there is no action to take based on the multi-system performance index, the local performance index is used to select a receiver that will most help the local system meet its goals.

The performance bottleneck, relative to the controlled variables, is determined (117) by using state samples (125), a well known technique. The controlled variables are protective processor storage target (133) (affects paging delay), swap protect time target (132) (affects swap delay), multiprogramming level (MPL) target (107) (affects MPL delay), and dispatch priority (104) (affects CPU delay).

At (118), the potential changes to the controlled variables are considered. A user performance goal class is selected (123) for which a performance decrease can be made based on the relative goal importance (108) and the current value of the performance indexes (151, 152). The user performance goal class thus selected is referred to as the donor. Next, the proposed changes are assessed (124) for net value relative to the expected changes to the multi-system and local performance indexes for both the receiver and the donor for each of the controlled variables (dispatch priority (120) (104), the swap protect time target (130) (132), the protective processor storage target (131) (133), and the MPL target (121) (107)). A proposed change has net value if the result would yield more improvement for the receiver than harm to the donor relative to the goals. If the proposed change has net value, then the respective controlled variable is adjusted for both the donor and the receiver.

Each system to be managed is connected to a data transmission mechanism (155) that allows each system to send data records to every other system. At (153) a data record describing the recent performance of each goal class is sent to every other system.

The multi-system goal driven performance controller (MGDPC) function is performed periodically, (once every ten seconds in the preferred embodiment) and is invoked via a timer expiration. The functioning of the MGDPC provides a feedback loop for the incremental detection and correction of performance problems so as to make the operating system adaptive and self-tuning.

At (154) a remote data receiver receives performance data from remote systems asynchronously from the MGDPC. The received data is placed in a remote performance data histories (157,158) for later processing by the MGDPC.

PRIMARY PROCESSING STEPS

Figure 2:
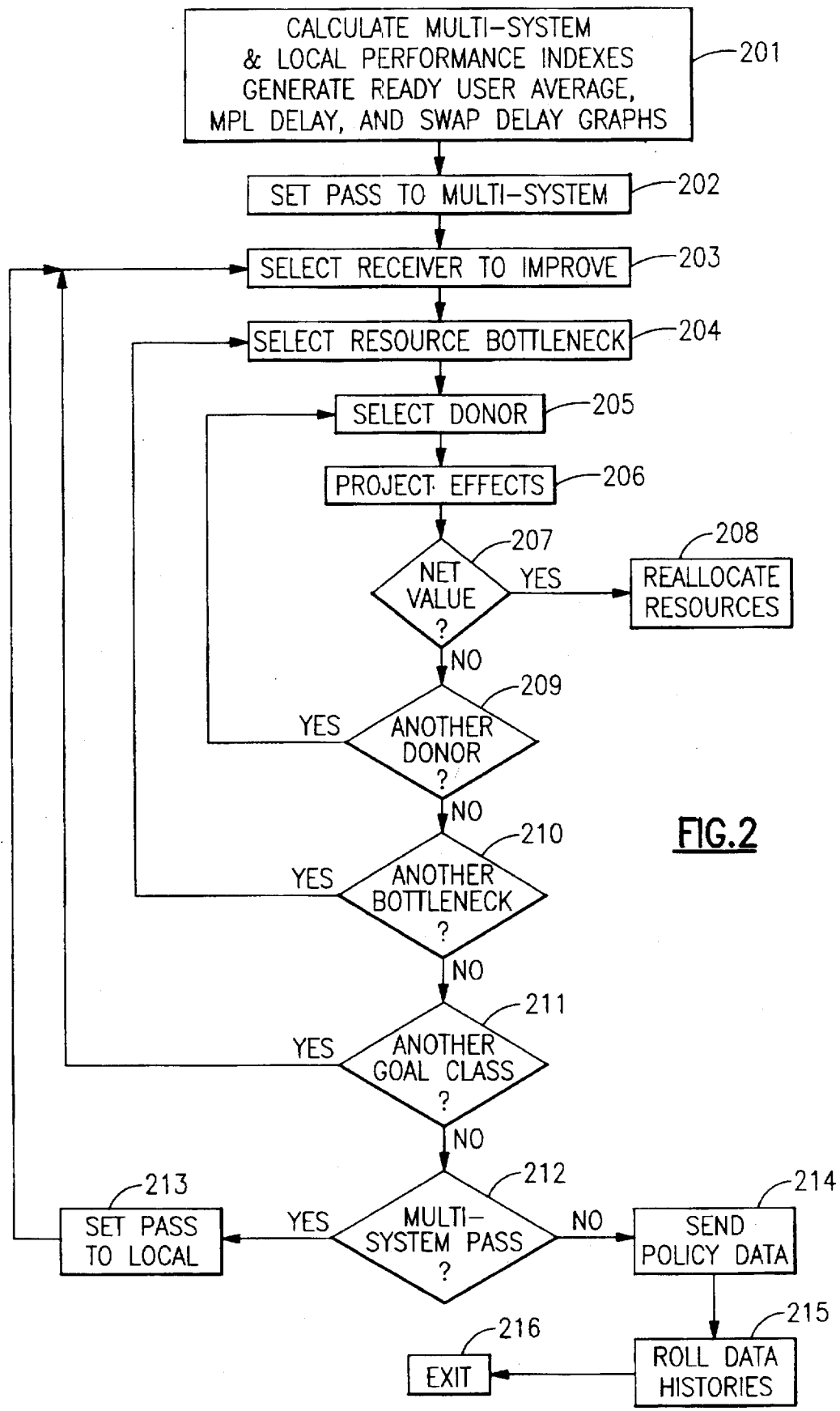
FIG. 2 is a flowchart showing the overall logic flow in the goal-driven performance-controller component.

FIG. 2 is a flowchart showing the logic flow for the primary processing steps of the multi-system goal driven performance controller (MGDPC) of the present invention.

The primary objective of the MGDPC is to meet performance goals across all the systems being managed. This objective is met without any centralized control. Instead, each system receives performance data from all the other systems being managed and, based on its view of how the entire distributed workload is doing, makes resource allocation decisions to best meet goals. A secondary objective of the MGDPC is to meet performance goals locally, in which case resource allocation decisions are made using local and remote data.

Figure 18:
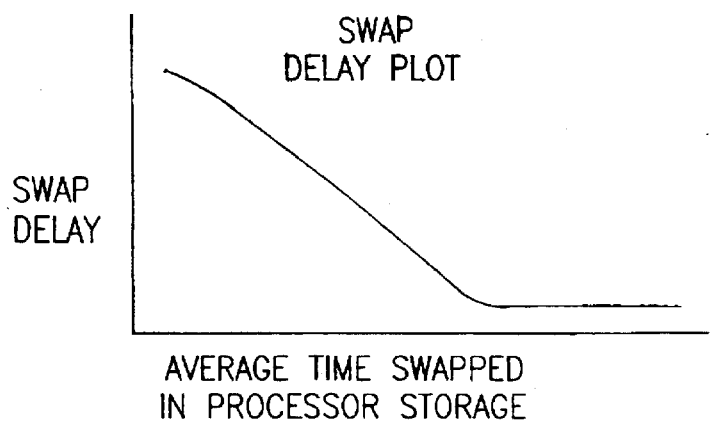
FIG. 18 is a sample graph of swap delay.

At (201), a multi-system and a local performance index are calculated for each user performance goal class and the current values are calculated for the ready-user-average graph (FIG. 15), the MPL-delay graph (FIG. 16), and swap-delay graph (FIG. 18). (The performance index calculation is described below.) Up to two passes may be made through steps (203)–(213). The first pass is called the multi-system pass. During the multi-system pass, receivers and donors are chosen based on how a goal class is performing across all the systems being managed. During the second pass, called the local pass, receivers and donors are chosen based on both how a goal class is performing locally in addition to how it is performing across all the systems being managed. The local pass is performed only when no action is taken during the multi-system pass. At (202), a loop control variable is set to indicate that the multi-system pass is currently being processed. At (203), a user performance goal class, referred to as the receiver, is selected to have its performance improved. The selection process is shown in more detail in FIG. 3, described later. At (204), one of the receiver's resource bottlenecks is selected as the bottleneck to be addressed. Bottleneck selection is shown in more detail in FIG. 5, described later. At (205), user performance goal classes that own the resource identified as required to improve the performance of the receiver are selected. These selected user performance goal classes are referred to as donors. Donors are selected in reverse order to receivers, that is, the user goal classes having the best performance indexes and least importance are selected. Donor selection is shown in more detail in FIG. 6, described later.

At (206), the effects of the resource reallocation from the donor to the receiver are projected. The algorithms used to project the effects of resource reallocation depend on the resource involved. Each of the algorithms is described below in this specification. At (207), the net value of reallocating the resource from the donor or donors to the receiver is assessed. A receiver will only be improved by reallocating resource from a specific donor if there is projected to be net positive value to the resource reallocation. If using a donor to improve a receiver is projected to result in more harm to the donor than improvement to the receiver relative to the goals and importance, the resource reallocation is not done. Net value assessment is shown in more detail in FIG. 8, described later.

If there is net positive value to the reallocation, the resources are reallocated from the donor or donors to the receiver at (208). If there is not net positive value, a check is made at (209) to determine whether there is another potential donor.

If there is another potential donor, control passes to (205) to select another potential donor. If there are no more potential donors of the resource required to address the selected bottleneck, a check is made at (210) to determine whether the receiver has another bottleneck.

If the receiver has another bottleneck that can be addressed, control returns to (204) to select another bottleneck. If the receiver has no more bottlenecks to address, a check is made at (211) to determine whether there is another potential receiver.

If there is another potential receiver, control returns to (203) to select another potential receiver. If there are no more potential receivers, a check is made at (212) to see if the loop control variable indicates that the current pass is the multi-system pass. If the current pass is the multi-system pass, at (213) the loop control variable is set to indicate that the current pass is the local pass and control returns to (203) to select another potential receiver.

If the local pass has already been taken, control passes to (214) to send performance data to each of the remote systems that is being managed. At (215) data histories are rolled (see description of data histories below).

The MGDPC function is invoked again when the timer next expires, providing feedback on the effect of the resource reallocations made previously and again providing the opportunity to address performance problems.

DATA HISTORIES

Figures 20, 21:
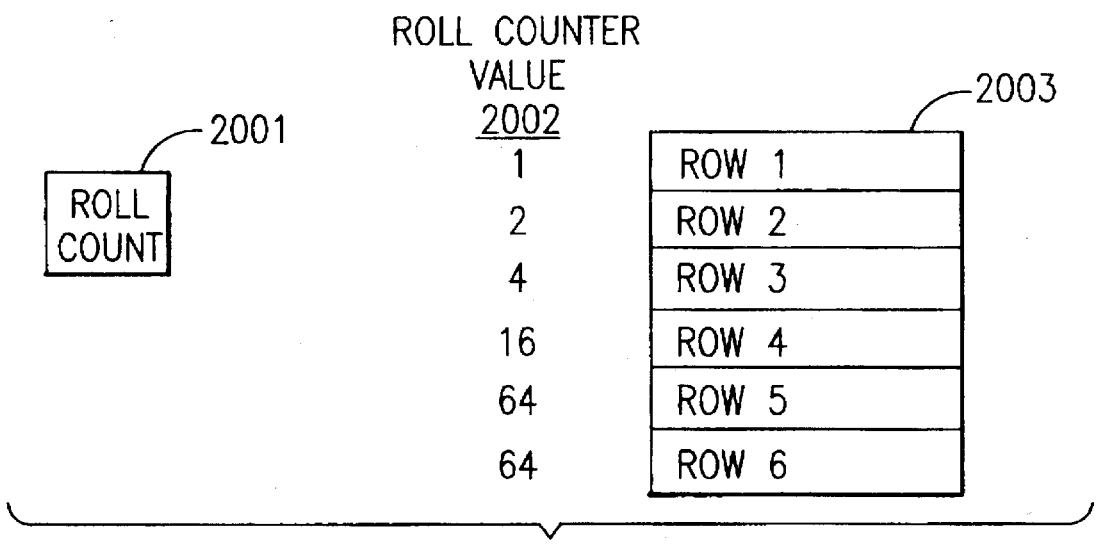
FIG. 20 shows the parts of a data history
FIG. 21 diagrams a row of the remote response time data history.

A data history is a mechanism to collect and analyze data over time. By using data histories the MGDPC can use data that has enough samples to be representative without using data that is so old that it might be out of date. FIG. 20 shows an exemplary data history. A data history contains 6 rows of data (2003) and a roll counter (2001). Each row represents data from a range of time in history. Row 1 contains data from the most recent period only. Rows 2–6 contain varying ranges of older data. The roll counter controls when to roll a row of data from one time range to a time range further back in time. The roll counter is incremented each MGDPC interval. Each row has associated with it a number (2002) that corresponds to the roll counter value specifying when the data in the row should be 'rolled'. Row 1's row counter value is 1, which means row 1 is rolled every interval. Row 2's interval number is 2; row 2 is rolled every second interval. Row 3's roll counter value is 4, row 3's roll counter value is 16, row 5's roll counter value is 64, and row 6's roll counter value is 64.

Data is added to the history as follows. New data is added to row 1. At the end of each MGDPC interval the highest row whose roll counter value evenly divides into the current roll counter value is found. The contents of that row is added to the next numerically higher row. The contents of all the numerically lower rows are moved up one row, leaving row 1 empty. When it is time to roll data out of row six, the data is discarded. To get data from a data history, the data from rows 1 through n are added together. The value of n is chosen such that the data used was gathered over a long enough interval with enough samples to be representative.

Each goal class with a response time goal has a local and remote response time history (157) which contains the performance data received from remote systems for the goal class. Each row in this history is an array with 28 entries. FIG. 21 shows layout of the array. Each entry in this array contains the number of completions that had response time within a certain percentage of the goal. The first entry contains the count of completions that had a response time of less than half the goal. The second entry contains the count of completions that had a response time of more than half the goal but less than 0.575 times the goals.

Each goal class with velocity goals has a remote velocity sample history (158). Each row of this history is an array with two entries. The first entry contains a count of the number of times work in the goal class was sampled as running. The second entry is a count of the number of times work in the goal class sampled as running or delayed (non-idle).

PERFORMANCE INDEX

The performance index is calculated (115) for execution velocity goals (111) as follows:

(execution velocity goal)/(actual execution velocity)

The performance index is calculated (115) for response time goals (110) as follows:

(actual response time)/(response time goal)

Execution velocity is the time work in the user goal performance class is running, divided by the time work is running or delayed, expressed as a percentage. The performance index is the goal divided by the actual execution velocity for work with execution velocity goals and actual response time divided by the response time goal for work with response time goals.

A performance index of 1.0 indicates the user performance goal class is exactly meeting its goal. A performance index greater than one indicates the class is performing worse than its goal, and a performance index less than 1.0 indicates the class is performing better than its goal. A multi-system performance index indicates how the user performance goal classes are performing across all the systems being managed. The local performance index indicates how the user performance goal classes are performing on the local system.

For response time goals, the local performance index is calculated from data from the local response time history (126). FIG. 21 shows a row of the local response time history (126). For goal classes having response goals of less than or equal to 20 seconds, enough rows of the local response time history are added together to comprise at least a 100 completions. For goal classes having longer response time goals, enough rows are added together to comprise at least 10 completions. At least the first two rows of the history are always used. When adding the rows together, the values in the first row are doubled to more heavily weight recent information. Next a response time is projected for each in-flight work unit as follows:

1. Find the average amount of service used by work units assigned to the same goal class that completed with more service time than the work unit in question has used so far.
2. Subtract the amount of service time the work unit has used so far from this average to get a projection for the amount of additional service time the work unit will use.
3. Divide the projection for addition service time by the rate the work unit is accumulating service time to get a projection for the time until the work unit completes.
4. Add the projection for the time until the work unit completes to the length of time the work unit has already run to get the projection for the work units response time.

Each projected completion for in-flight work units is added to the appropriate entry in the row built from the local response time history. From this combined row a local average response time is calculated and this average response time is divided by the goal to calculate the local performance index.

For execution velocity goals, the local execution velocity is calculated from the local samples history (114). Each row of the local samples history (114) is an array where the first entry is a count of the number of times work units in the goal class have been sampled running, and the other entries are counts of the number of times work units in the goal class were sampled delayed for each of the eight delay-states addressed by Eilert. The delay states sampled are: CPU delay, MPL delay, swap delay, private area auxiliary storage paging delay, common area auxiliary storage paging delay, cross memory paging delay, virtual input/out (VIO) auxiliary storage delay, and hiperspace auxiliary storage paging delay. The techniques for sampling these delays are well known in the art.

When taking data from the local samples histories (114), enough rows are added together to include at least 500 samples. The first two rows of the history are always used. When adding the histories rows together, the first row is doubled to more heavily weight the most recent data. To calculate the current velocity the CPU using samples from the combined row are divided by the total samples in the combined row. This local velocity is divided into the class's goal to calculated the local performance index.

MULTI-SYSTEM PERFORMANCE INDEX

Figure 23:
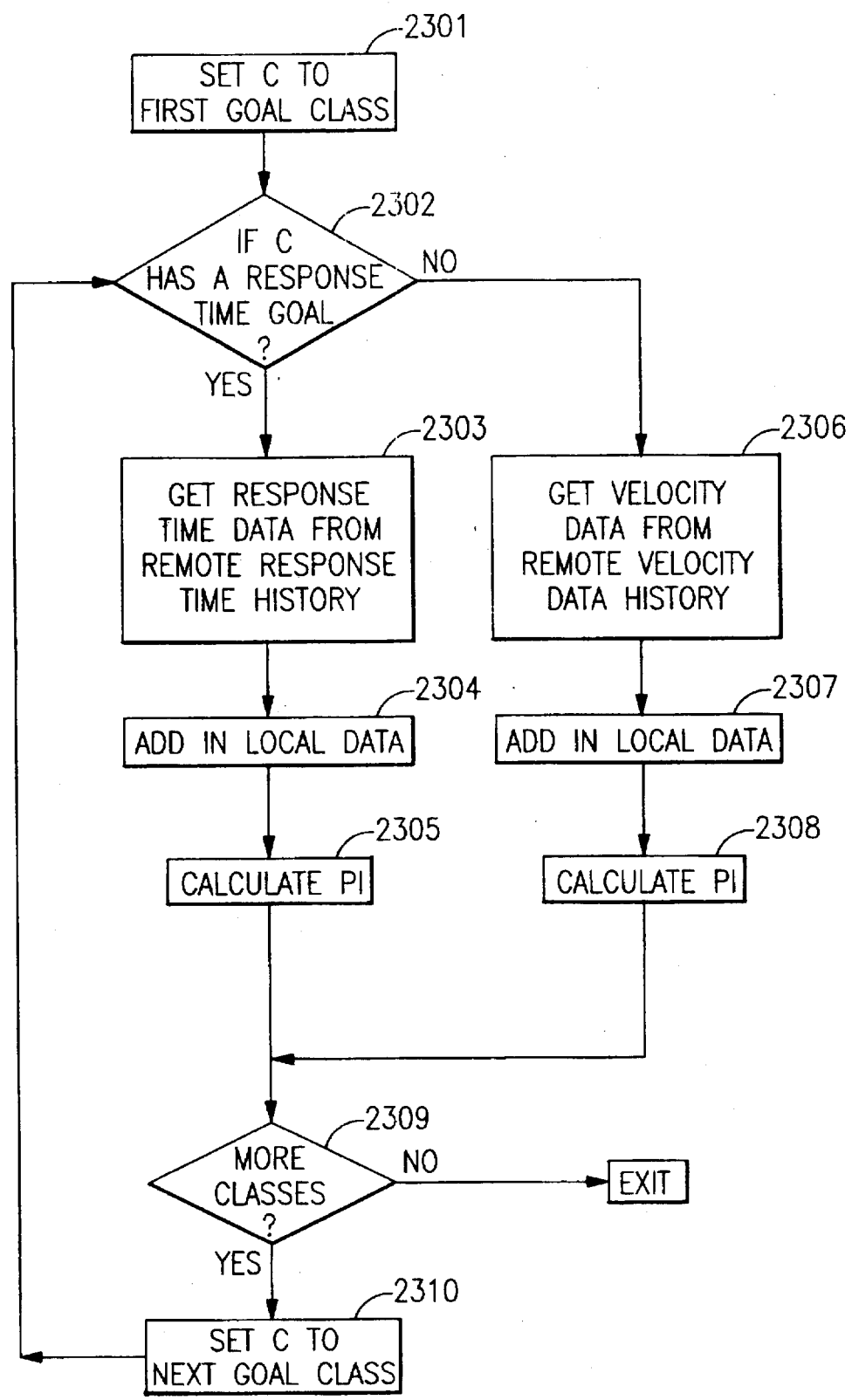
FIG. 23 is a flow chart of the steps taken to calculate the multi-system performance index.

The following steps are taken to calculate the multi-system performance index for each goal class and illustrated in FIG. 23. At (2301) the variable C is set to the first goal class. At (2302) C is tested to determine whether the goal class has a response time goal. If C has a response time goal, control passes to (2303) where data is taken from the remote response time history. When taking this data from the remote response time history, enough rows of the history are used to represent the same amount of time as the data used to calculate the local performance index (see description of data histories above). The response time data returned from the remote response time history is in the form of one row of the history (see FIG. 20). To get data representing all the systems being managed, the local response time data used to calculate the local performance index is added to remote data at (2304). From the combined response time data an average response time is calculated, and this average is used to calculate the multi-system performance at (2305).

If the goal class specified by C has an execution velocity goal, control passes to (2306) where data is taken from the remote velocity history. When taking this data from the remote velocity history, the same number of rows are used as were taken from the local samples history when calculating the local performance index. The local execution velocity data is added to this remote data at (2307) by added to the first entry of the combined row the local cpu using samples used to calculate the local velocity and adding to the second entry of the combined row the sum of the delay state counts used to calculate the local velocity. From this multi-system execution velocity data a multi-system velocity is calculated; and from the multi-system velocity, the multi-system performance index is calculated at (2308).

If there are more goal classes to process (2309), control passes to (2311) where C is set to the next goal class. Then control returns to (2302) to process the next goal class.

SEND PERFORMANCE DATA

At the end of the multi-system goal driven performance controller interval a data record describing the performance of each goal class during the interval is sent to each remote system being managed. FIG. 24 shows the performance data that is sent to each remote system. For a performance goal class having response time goals, this data record contains the goal class name (2401) and an array with 28 entries (2402) equivalent to a row of the remote response time history that describes the completions in the goal class over the last MGDPC interval. For a goal class with velocity goals this data record contains the goal class name (2403), the count of times work in the goal class was sampled running in the last MGDPC interval, and the count of times work in the goal class was sampled as running or delayed in the last MGDPC interval (2404).

REMOTE DATA RECEIVER

FIG. 22 show a flow chart of the logic flow for receiving remote performance data. At (2201) the incoming data record is checked to verify that is coming from a system running with exactly the same set of goal classes and performance goals. If this check fails, the data record is ignored (2202). At (2203) the performance goal class table is searched to find the goal class with the same name as the goal class represented by the incoming data record. If the goal class found by this search has a response time goal (2204), the response time data in the incoming data record is added to the goal class's remote response time data history; otherwise, the velocity data in the incoming record is added to the goal class's remote velocity data history. The use of data histories to manage the remote performance data allows the systems being managed to operate independently. If data from a remote system does not arrive for one MGDPC interval, the data history mechanism will compensate if necessary by using older data to ensure that data with enough samples to be representative is used. Also if one of the remote system being managed goes down, its data will gracefully age out of the data history without the other system having to be specifically notified that a system went down.

SELECT RECEIVER TO IMPROVE

Figure 3:
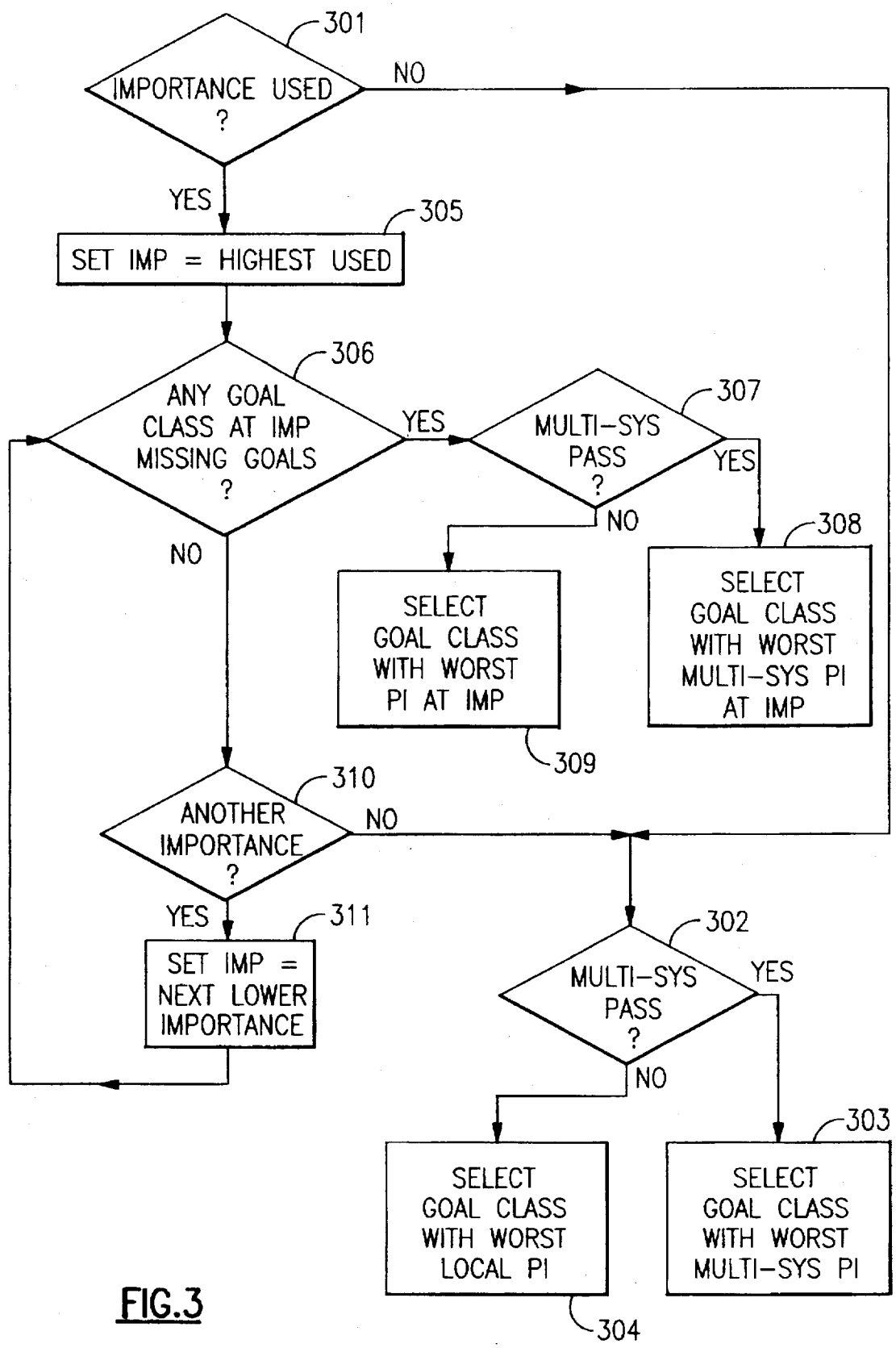
FIG. 3 is a flowchart showing logic flow for the select-receiver function.

FIG. 3 shows a flow chart of the logic flow for selecting a performance goal (116) class to receive a performance improvement. At (301) the performance goal class table is searched to determine whether any entries have an associated importance value. Importance values are optional when specifying the performance goals. If no importance values have been specified for any of the goal classes, at (302) the MGDPC pass is tested to determine whether the current pass is the multi-system pass or the local pass. If the current pass is the multi-system pass, the goal class having the worst (highest) multi-system performance index is selected (303). If the current pass is the local pass, the goal class having the worst local performance index is selected (304).

If importance values have been specified, the importance value to be considered is initialized to the highest importance value specified for any performance goal class (305). At (306) the set of goal classes with the importance being considered is checked to determine whether any of these goal classes is missing its goal. The definition of goal-missing depends on the MGDPC pass being performed. If the MGDPC pass is the multi-system pass, a goal class is considered to be missing its goal if its multi-system performance index is greater than 1. If the MGDPC pass is the local pass, a goal class is considered to be missing its goal if either its multi-system or local performance index is greater than 1. If there is a goal class at the importance being considered that is missing its goal, a goal class is chosen based on the MGDPC pass (307). That is, if the pass is the multi-system pass, the goal class with the worst multi-system performance index is chosen (308); if the pass is the local pass, the goal class with the worst local performance index is chosen (309).

If no goal class is missing its goal at the importance being considered, and if another lower importance value has been specified (310), the next lower importance value specified is set to be considered (311) and control returns to (306). If no goal class at any importance is missing its goal, control passes to (302) to chose the goal class with the worst performance index based on MGDPC pass.

FIND BOTTLENECK

FIG. 4 illustrates the state data used to select resource bottlenecks (117) to address. For each delay type, the performance goal class table entry contains the number of samples encountering that delay type and a flag indicating whether the delay type has already been selected as a bottleneck during the present invocation of the multi-system goal driven performance controller. In the case of the cross-memory-paging type delay, the class table entry also contains identifiers of the address spaces that experienced the delays.

The logic flow of the find bottleneck means is illustrated in FIG. 5. The selection of a bottleneck to address is made by selecting the delay type with the largest number of samples that has not already been selected during the present invocation of the multi-system goal driven performance controller. When a delay type is selected, the flag is set so that delay type is skipped if the find bottleneck means is reinvoked during this invocation of the multi-system goal driven performance controller.

In FIG. 5 at (501), a check is made to determine whether the CPU delay type has the largest number of delay samples of all the delay types that have not yet been selected. If yes, at (502), the CPU-delay-selected flag is set and CPU delay is returned as the next bottleneck to be addressed. At (503)

a check is made to determine whether the MPL delay type has the largest number of delay samples of all the delay types that have not yet been selected. If yes, at (504), the MPL-delay- selected flag is set and MPL delay is returned as the next bottleneck to be addressed. At (505) a check is made to determine whether the swap delay type has the largest number of delay samples of all the delay types that have not yet been selected. If yes, at (506), the swap-delay-selected flag is set and swap delay is returned as the next bottleneck to be addressed.

At (507) a check is made to determine whether the paging delay type has the largest number of delay samples of all the delay types that have not yet been selected. If yes, at (508), the paging-delay-selected flag is set and paging delay is returned as the next bottleneck to be addressed. There are five types of paging delay. At step (507), the type with the largest number of delay samples is located, and at (508), the flag is set for the particular type and the particular type is returned. The types of paging delay are: private area, common area, cross memory, virtual input/output (VIO), and hiperspace each corresponding to a page delay situation well known in the environment of the preferred embodiment (MVS/ESA)™.

FIXING DELAY

This section describes in particular how the receiver performance goal class performance is improved by changing a controlled variable to reduce the delay selected by the find bottleneck means.

GENERAL FIX FLOW

Figure 7:
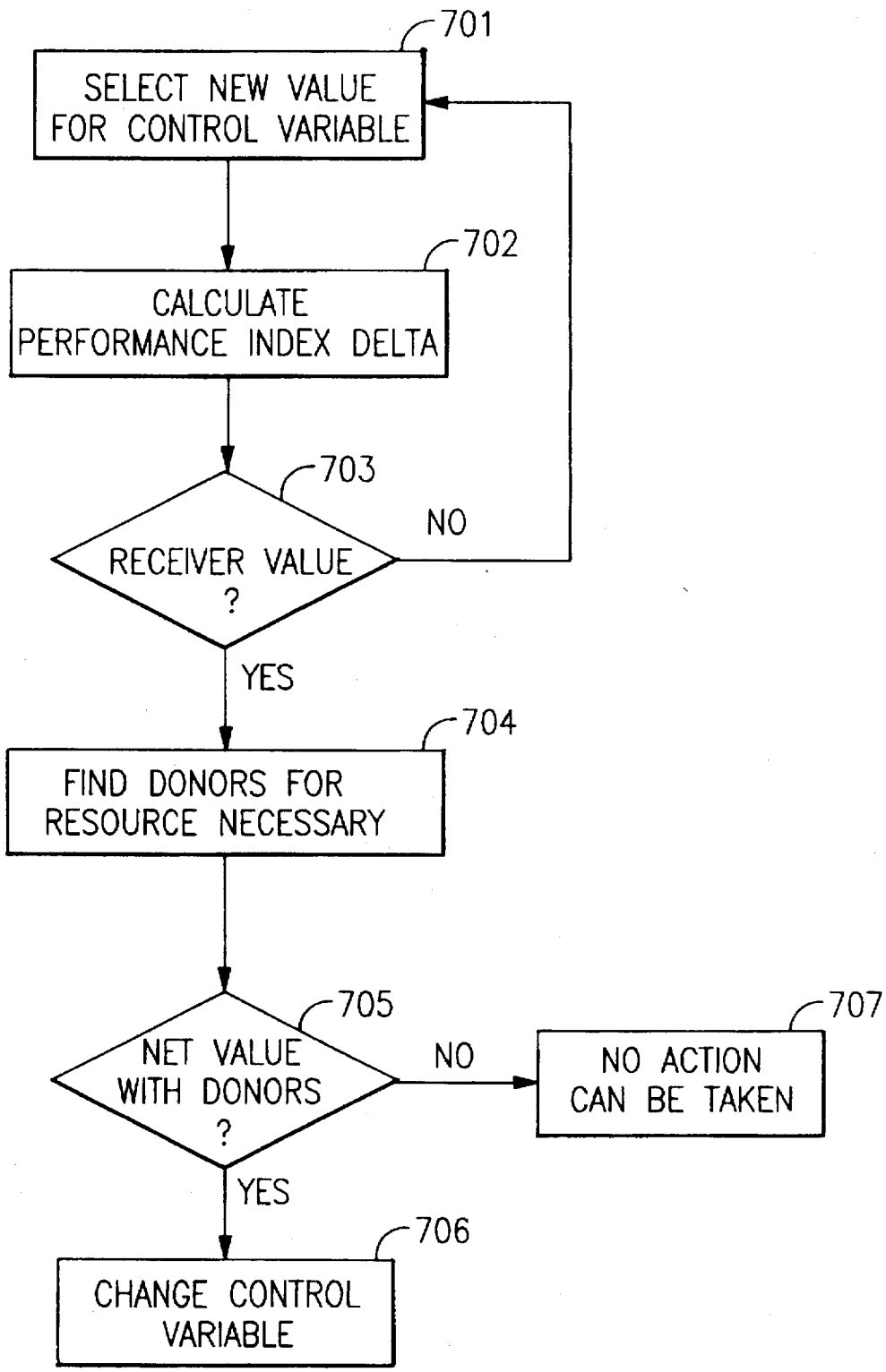
FIG. 7 is a flowchart showing logic flow for the fix means.

FIG. 7 illustrates the steps required by the Fix means (118) to assess improving a receiver goal class performance by changing the system control data element related to the chosen resource bottleneck. At (701), a new value is chosen for the controlled variable. At (702), the change to the multi-system and local performance indexes is calculated for the receiver performance goal class. The details of this calculation are specific to individual resources and are described below. At (703), the improvement in the performance index is checked to determine whether the change results in sufficient value to the receiver. If there is not sufficient receiver value, control returns to (701) where a value is chosen for the controlled variable that will result in greater benefit for the receiver.

When there is sufficient receiver value, control passes to (704) where the select donor means (123) is called to find donors of the resource needed to make the control variable change. At (705), a check is made to see whether the proposed change has net value. For the change to have net value the benefit to the receiver in relation to goals and importance must be more than the harm to the donors. If the proposed change does have net value, the controlled variable is changed at (706). If there is not net value, the chosen resource bottleneck cannot be fixed (707).

SELECT DONOR

Figure 6:
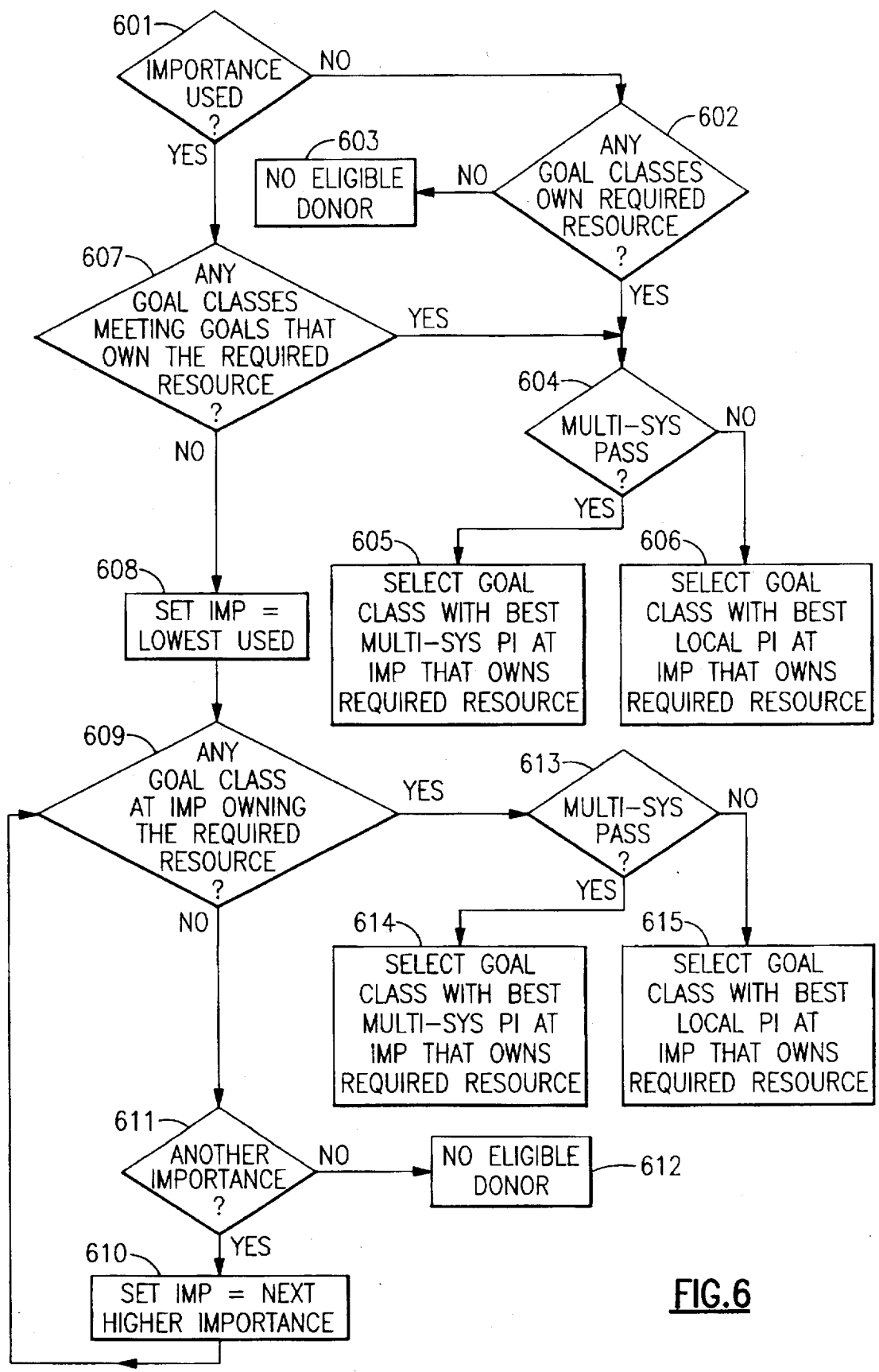
FIG. 6 is a flowchart showing logic flow for the select-donor function.

FIG. 6 is a flowchart showing logic flow for the select-donor function (123). The purpose of the select-donor function is to choose from the set of goal classes that own the required resource the most eligible goal class to donate that resource to the receiver. At (601) the performance goal class table is searched to determine whether any entries have an associated importance value. If no goal class has an importance value associated with it, the select donor means determines whether any goal class owns the required resource (602). If no goal class owns the required resource, there is no eligible donor (603). If there are such goal classes, the select donor means chooses as the donor the goal class having the best performance index based on the MGDPC pass (604–607). If the current pass is the multi-system pass, the multi-system performance index is used; otherwise, the local performance index is used.

If there are goal classes with importance specified, the select donor means determines whether there are any goal classes owning the require resource that are meeting goals (607). As with the select receiver means, if the MGDPC pass is multi-system, a goal class is considered to be meeting its goal if its multi-system performance index is less than or equal to 1. If the current pass is the local pass, a goal class is considered to be meeting its goal if both its multi-system and its local performance indexes are less than or equal to 1. If there are goal classes meeting goals that own the required resource, control passes to (604) to chose the goal class with the best performance index based on MGDPC pass. Importance is not used to differentiate among goal classes meeting their specified goals.

If there is no goal class that is both meeting its specified goal and that owns the required resource, the select donor means finds the goal classes that have the lowest specified importance value and that own the required resource (608–611). If there are such goal classes, select the donor chooses the goal class having the best performance index based on MGDPC pass (613–615). If no goal class owns the required resource, there is no eligible donor in the system (612).

ASSESS NET VALUE

Figure 8:
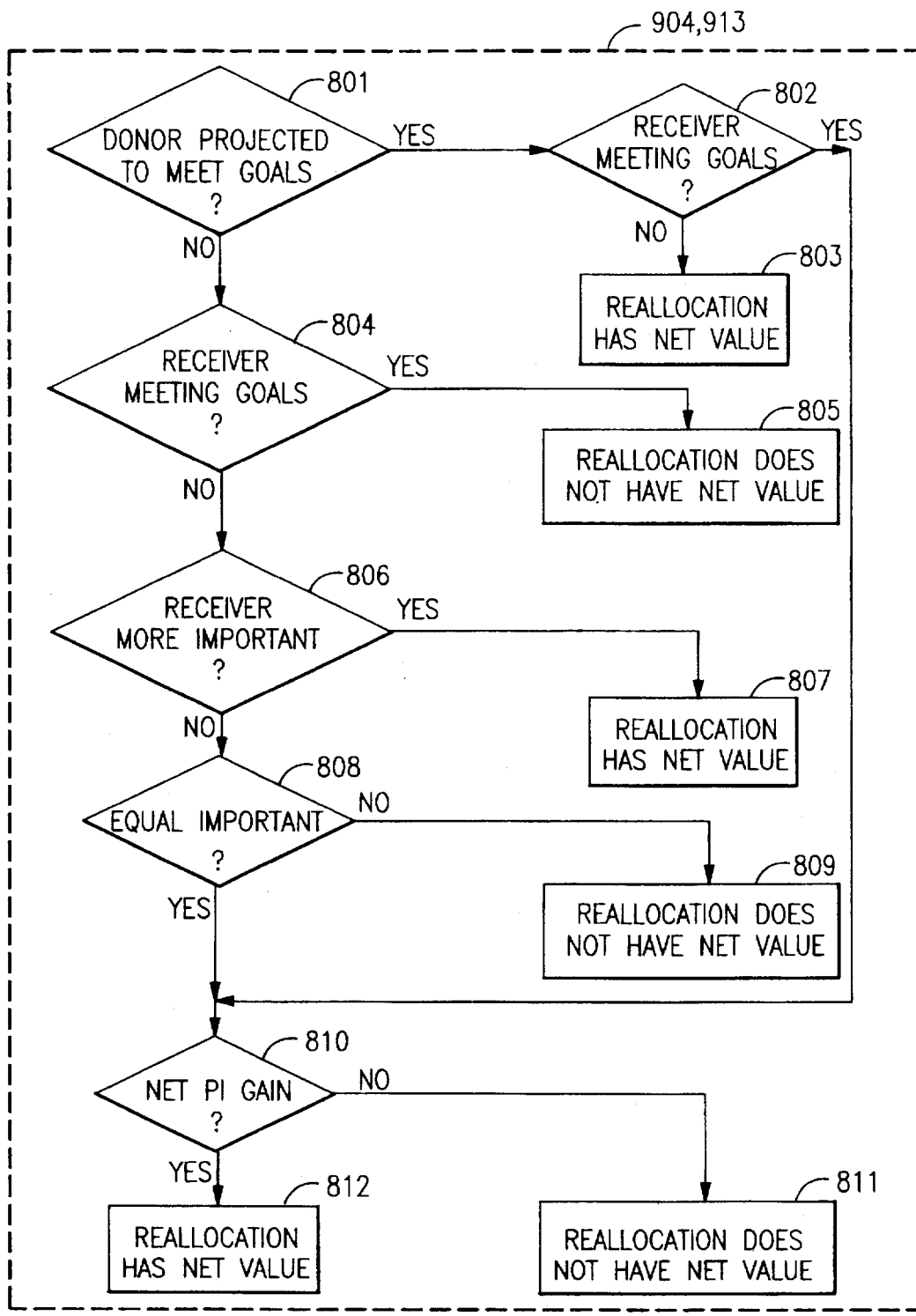
FIG. 8 is a flowchart showing the general logic flow for the assess-net-value function for proposed changes.

FIG. 8 illustrates the steps used by the assess net value means (124) to determine the net value of a contemplated reallocation of resources between the receiver and the donor. If the resource donor is projected to meet its goal (801) and the receiver is missing its goal (802), the reallocation has net value (803). Note that on the MGDPC multi-system pass a goal class is considered to be meeting goals if its multi-system performance index is less than or equal to 1. On the MGDPC local pass a goal class is considered to be meeting goals if both its multi-system and local performance indexes are less than or equal to 1.

If the donor is projected to miss its goal and the receiver is meeting its goal the action does not have net value (805). If both the donor and the receiver are missing goals, the reallocation has net value if the receiver is more important (as indicated by the importance value (108)) than the donor (807) and does not have net value if the donor is more important the receiver (809). At (810) either both the receiver and donor are missing goals and are equally important, or both are meeting their goals. In this case the reallocation has net value if it causes a net multi-system performance index (PI) gain. On the MGDPC local pass, the reallocation must also have a net local performance index gain. A resource reallocating has a net performance index gain if both of the following conditions are true:

1. The projected performance index value decrease (performance improvement) for the receiver is more than the projected performance index value increase (performance degradation) of the donor.
2. If the receiver is projected to have a lower performance index value (better performance) than the donor, the receiver's performance index value must be projected to be closer to the donor's performance index value after the reallocation than before.

For item 1 above, when comparing the projected performance index decrease of the receiver to the projected performance index increase of the donor, the receiver only gets credit for the part of its performance index value decrease above 0.90. Similarly, the donor only gets credit for the part of its performance index value increase above 0.90. For example, if the receiver's performance index value was projected to improve from 1.50 to 0.70, the performance index decrease used in the comparison would be 0.60.

RECEIVER VALUE

Checking for sufficient receiver value is an optimization. A receiver is only helped when there is projected to be sufficient receiver value. Receiver value is a minimum performance index improvement criterion. In the preferred embodiment, for example, the receiver value criterion requires an improvement of at least 10 percent of the difference between the receiver's current performance index and 1.00. This criterion is designed to reject very small improvements. The reason for rejecting actions having too little receiver value is to avoid making changes that yield only marginal improvements.

CPU DELAY

This section describes improving performance by reducing the CPU delay (120) experienced by the receiver.

Figure 9:
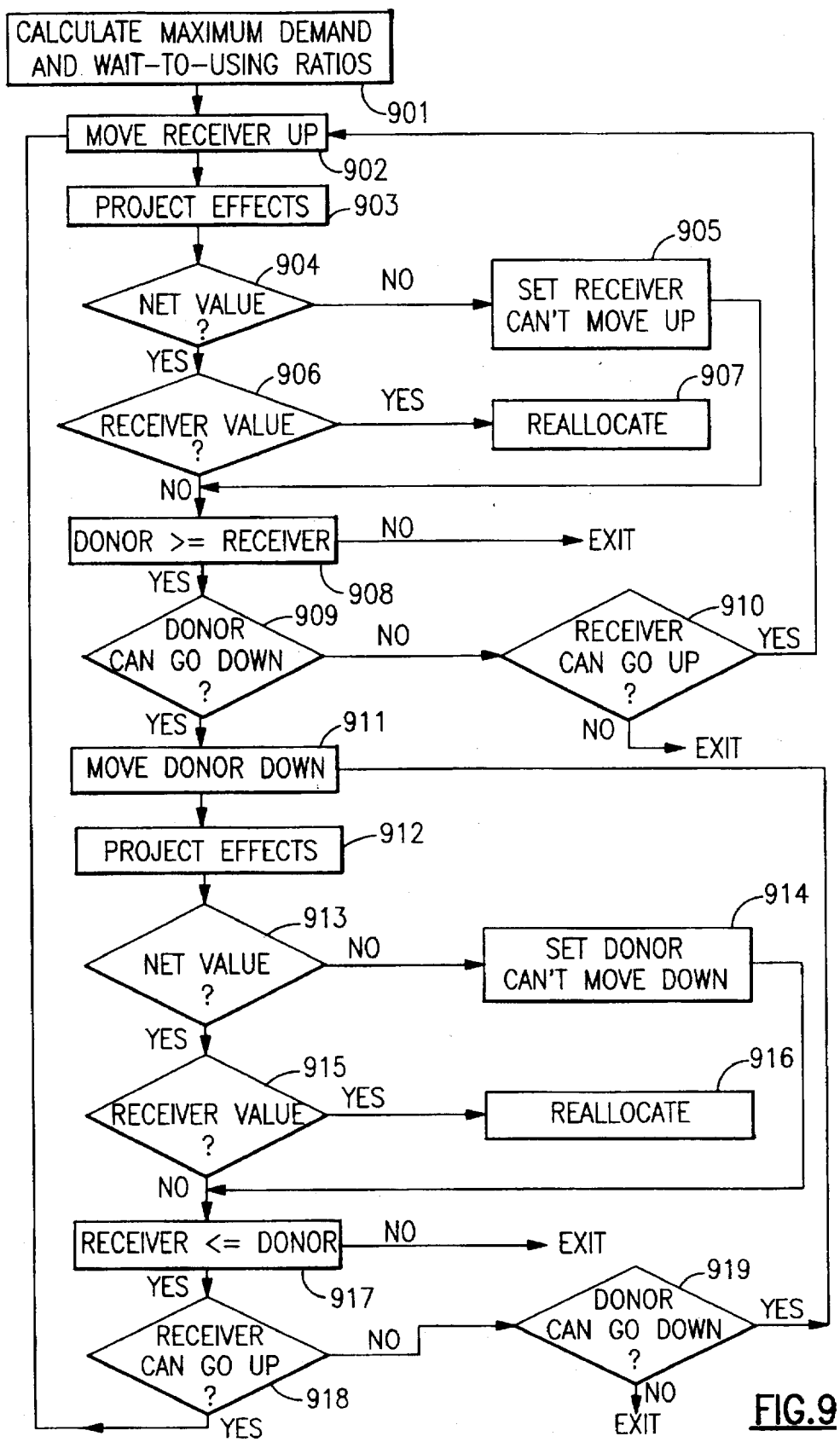
FIG. 9 is a flowchart of the steps to assess improving performance by increasing dispatch priority.

FIG. 9 illustrates the steps to find a new set of dispatching priorities to be used to improve the receiver's performance without inequitably harming the donor's performance. FIGS. 9–13 provide the steps involved in making the performance index delta projections provided by the fix means (118) to assess net value means (124).

At (901), the maximum demand and wait-to-using ratios are calculated for each goal class and accumulated for all the goal classes at each priority. These calculations are described later in the specification. A table of these values is constructed where each row represents the dispatch priority and the two columns are the wait-to-using ratio and the maximum demand, accumulated for all the performance goal classes at the corresponding dispatch priority value. This table is called the wait-to-using table and is used to project new wait-to-using values for a new dispatch priority, as described later. Wait-to-using ratios (CPU delay samples divided by CPU-using samples) are a well known concept in computer systems performance measurement. Maximum demand is new. Maximum demand is the theoretical maximum percentage of total processor time that a service period can consume if it has no CPU delay. The maximum demand calculation is shown later in this specification.

Figure 10:
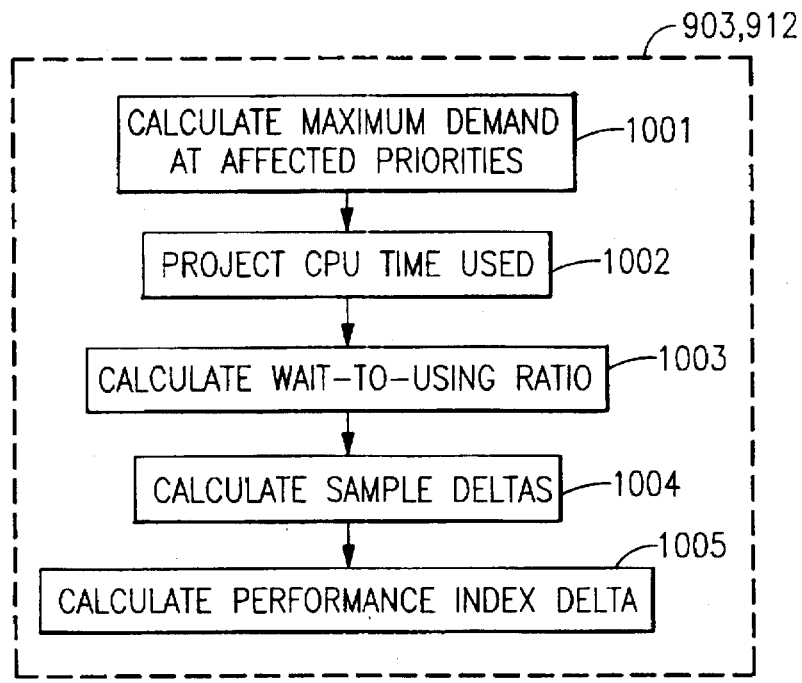
FIG. 10 is a flowchart showing logic flow for projecting the effects of changing dispatching priorities.

Steps (902) through (909) illustrate alternately assessing increasing the receiver's dispatching priority (moving the receiver up) and decreasing the donor's dispatching priority (moving the donor down) until the combination of moves produces sufficient receiver value or insufficient net value. The steps to project the effects of a move (903 and 912) are illustrated in FIG. 10. The net value check is shown in FIG. 8. If either net value check fails, secondary donors and receivers are selected to be moved up with the receiver or down with the donor to determine whether that combination of moves will pass the net value check.

If the combination of moves passes the net value check, secondary receivers and donors are moved along with the primary receiver and donors. Secondary donors and receivers are not found via the select donor means and the select receiver means; instead, secondary receivers are defined as those performance goal classes: 1) having a dispatch priority below the dispatch priority of the primary receiver and, 2) that failed the net value check. Analogously, secondary donors are those performance goal classes: 1) having a dispatch priority above the dispatch priority of the primary donor, and 2) that failed the net value check.

MAXIMUM DEMAND CALCULATION

Maximum demand is calculated as follows:

$$\text{maximum demand percentage} = \frac{(\text{number of work units}) \times (CPU\text{-using samples}) \times (100)}{(\text{total samples}) - (CPU \text{ delay samples})}$$

Maximum demand is the theoretical maximum percentage of total processor time a goal class can consume if it has no CPU delay.

ASSESS PRIORITY CHANGES

FIG. 10 illustrates the steps to project the effects of changing dispatching priorities. At 1001, the maximum demand of the performance goal class whose dispatch priority is to be changed is subtracted from its "from" (current) priority and added to its "to" (proposed new) priority. At 1002, the CPU time projected to be used by each class affected by the dispatch priority change is projected by reading from a graph the achievable demand percentage for each class, and then multiplying the achievable demand percentage by the total time available in the system. At 1003 new wait-to-using ratios are projected, at 1004 CPU-using and delay sample deltas are calculated, and at 1005 a performance index delta is calculated for each performance goal class affected by the change in dispatch priority.

ACHIEVABLE DEMAND GRAPH

Figure 11:
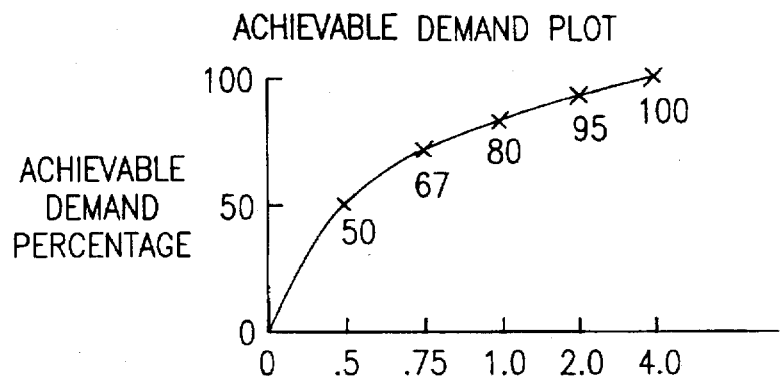
FIG. 11 is a sample graph of achievable demand.

FIG. 11 shows the achievable demand graph. The abscissa value is the quotient of the maximum demand available to a dispatch priority, divided by the total maximum demand at that dispatch priority. The maximum demand available to a dispatch priority is 100 minus the cumulative maximum demand at all dispatch priorities above the subject performance goal class dispatch priority. The maximum demand available to a dispatch priority cannot be less than zero in this calculation. The maximum demand at a dispatch priority is the total maximum demand for all classes at that dispatch priority.

The ordinate value of the achievable demand graph is the achievable demand percentage. The achievable demand percentage is the percentage of the maximum demand of a class that the class is projected to consume, given the maximum demand of all work at higher dispatching priorities and the maximum demand of all work at the same priority.

To project the CPU time to be used, the achievable demand percentage for a class is read off the achievable demand graph. The achievable demand percentage is used to project processor time consumption. CPU time consumption is calculated by multiplying achievable maximum demand by the maximum demand of the class times total CPU time.

The achievable demand graph differs from the others used in the present invention by the fact that all values for this graph are hardcoded. For all the other graphs, observations of real data from the running system are used. The values for the achievable demand graph were derived from modeling.

CPU WAIT-TO-USING RATIO

Figure 12:
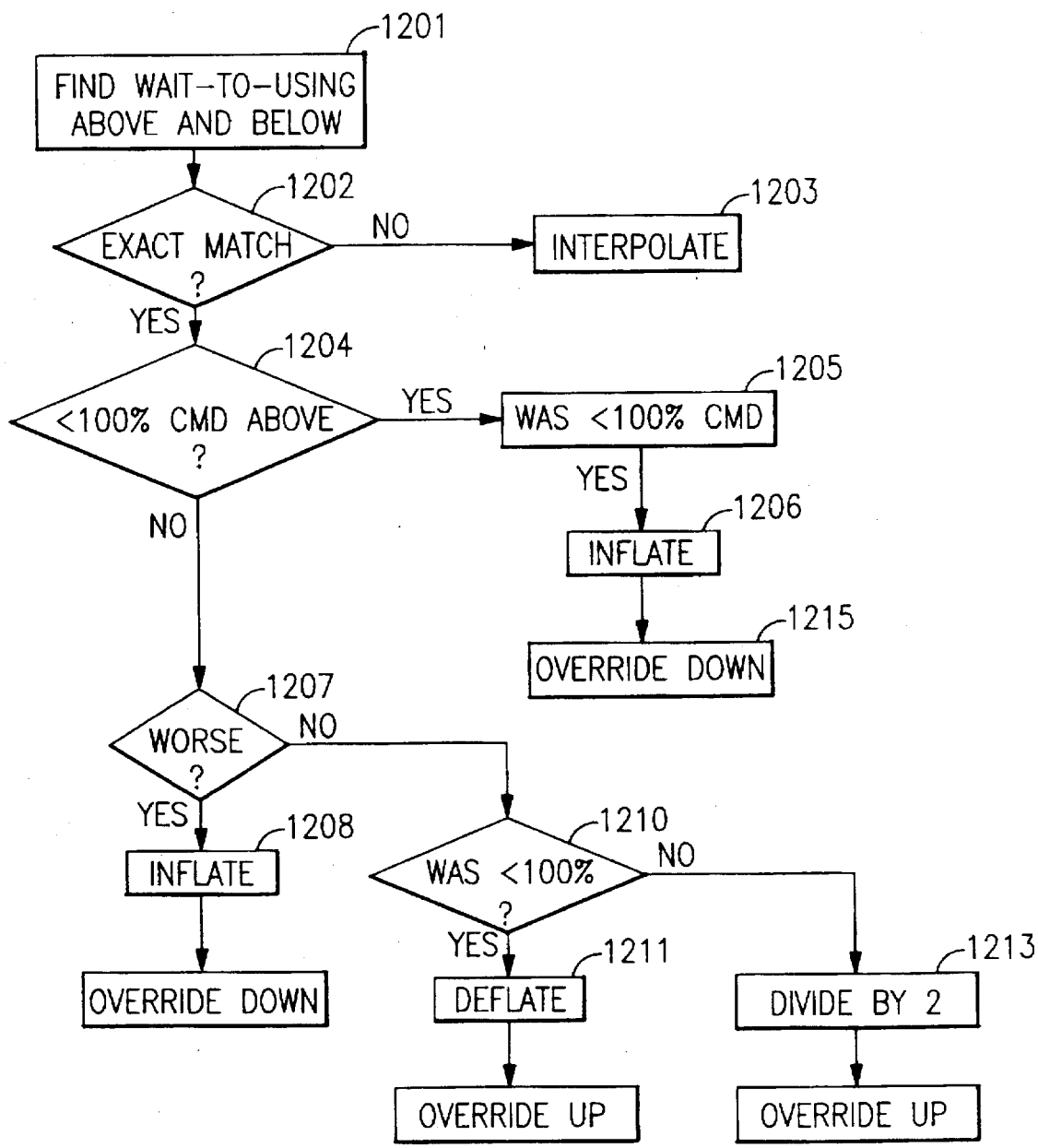
FIG. 12 is a flowchart for calculating a new wait-to-using ratio.

FIG. 12 illustrates calculating a new wait-to-using ratio using the wait-to-using table constructed as described earlier. The actual and projected wait-to-using ratios are used to calculate a new delay sample delta.

At (1201), the wait-to-using ratios at the nearest cumulative maximum above and below the projected cumulative maximum demand at the dispatching priority of interest are found in the wait-to-using table. If an exact match for the new cumulative maximum demand is not found in the table (checked at 1202), the wait-to-using ratios at the maximum demands above and below are interpolated to get the new wait-to-using ratio to use (1203). If an exact match is found, that wait-to-using ratios are adjusted.

If there is projected to be greater than 100% cumulative maximum demand above the dispatching priority of interest (1204), and there was less than 100% cumulative maximum demand (1205), the wait-to-using ratio is inflated by one-half the ratio of maximum demand that could have been consumed and the maximum demand that is projected to be consumed at the dispatching priority (1206).

If there is not projected to be greater than 100% cumulative maximum demand above the dispatching priority of interest (1204), and this cumulative maximum demand is worse than it was projected to be for the current dispatching priority (1207), the wait-to-using ratio is inflated by one-half the ratio of maximum demand that could have been consumed and the maximum demand that is projected to be consumed at the proposed dispatching priority (1208).

If there is not projected to be greater than 100% cumulative maximum demand above the dispatching priority of interest (1204), and this cumulative maximum demand is not worse than it was before (1207), and there was less than 100% cumulative maximum demand above (1210), then the wait-to-using ratio is deflated by the ratio of maximum demand that could have been consumed and maximum demand that is projected to be consumed at the priority (1211).

If there is not projected to be greater than 100% cumulative maximum demand above the dispatching priority of interest (1204), and this demand is not worse than it was for the current dispatching priority (1207), and there was not less than 100% cumulative maximum demand above (1210), the wait-to-using ratio is deflated by dividing it by 2 (1213).

In all inflation cases, if the inflated value is greater than the actual wait-to-using ratio at the next lower priority, then the wait-to-using ratio is overridden to the wait-to-using ratio at the next lower priority. If the deflated value is less than the actual wait-to-using ratio at the next higher priority, the wait-to-using ratio is overridden to the wait-to-using ratio at the next higher priority.

The wait-to-using ratio derived from the wait-to-using table is further adjusted for each individual performance goal class as follows:

W2U(adjusted)=W2U(from table)×(A/B)

where

A=service-weighted average mean-time-to-wait at priority

B=individual performance goal class mean-time-to-wait

CPU-USING SAMPLE DELTA

Figure 13:
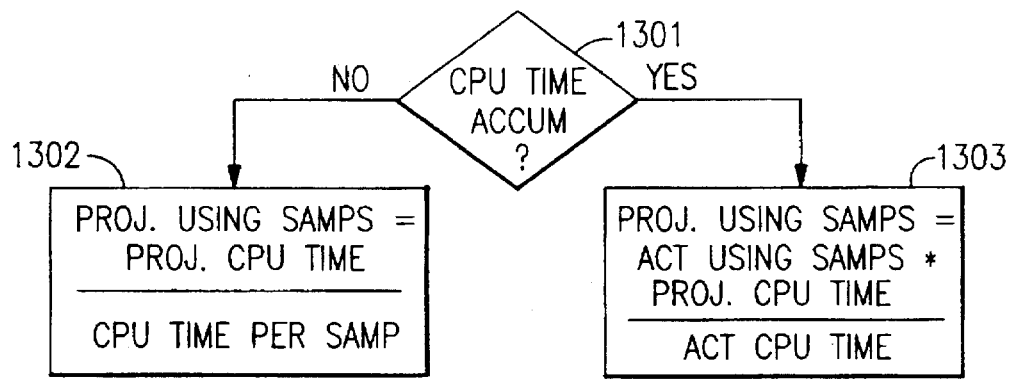
FIG. 13 is a flowchart for calculating CPU time using sample deltas.

FIG. 13 shows the logic flow for calculating CPU-using sample deltas. If the CPU time was accumulated for the performance goal class (checked at 1301), the projected using samples are set equal to the actual using samples, multiplied by the projected CPU time divided by the actual CPU time (1303). If the CPU time was not accumulated for the performance goal class, the projected using samples are set equal to the projected CPU time divided by the CPU time per sample (1302). The using sample delta is the projected samples minus the actual samples.

CPU DELAY SAMPLE DELTA

CPU delay sample deltas are calculated as follows:

$$(\text{projected delay samples}) = \frac{(\text{actual delay samples}) \times (\text{projected wait-to-using})}{(\text{actual wait-to-using})}$$

The projected delay samples are equal to the actual observed delay samples times the projected wait-to-using ratio divided by the actual wait-to-using ratio. The delay sample delta is equal to the projected samples minus the actual samples.

CPU PERFORMANCE INDEX DELTA

Performance index deltas are calculated for dispatching priority changes as shown below. Note: these equations go both ways for receivers and donors because the CPU-using and delay sample deltas are signed numbers. Also note that the sample deltas calculated above are for the local system.

response time goals:

$$(\text{proj local response time delta}) = \frac{(\text{delay samples delta}) \times (\text{actual local response time})}{(\text{local non-idle samples})}$$

$$(\text{projected local performance index delta}) = \frac{(\text{projected response time delta})}{(\text{goal})}$$

$$(\text{projected multi-system performance index delta}) = \frac{(\text{# of local completions}) \times (\text{proj local performance index delta})}{(\text{# of total completions across all systems})}$$

execution velocity goals:

$$(\text{new multi-system velocity}) = \frac{(\text{multi-system } CPU\text{-using}) + (\text{using delta})}{(\text{multi-system } non\text{-}idle \text{ samples}) + (\text{using delta}) + (CPU \text{ delay delta})}$$

$$(\text{multi-system performance index delta}) = \frac{(\text{current multi-system performance index}) - (\text{velocity goal})}{(\text{new multi-system velocity})}$$

$$(\text{new local velocity}) = \frac{(\text{local } CPU\text{-using}) + (\text{using delta})}{(\text{local } non\text{-}idle \text{ samples}) + (\text{using delta}) + (CPU \text{ delay delta})}$$

$$(\text{local performance index delta}) = \frac{(\text{current local performance index}) - (\text{velocity goal})}{(\text{new local velocity})}$$

MULTIPROGRAMMING LEVEL (MPL) DELAY

This section describes improving performance by reducing the MPL delay experienced by the receiver (121).

ASSESS MPL CHANGES

Figure 14:
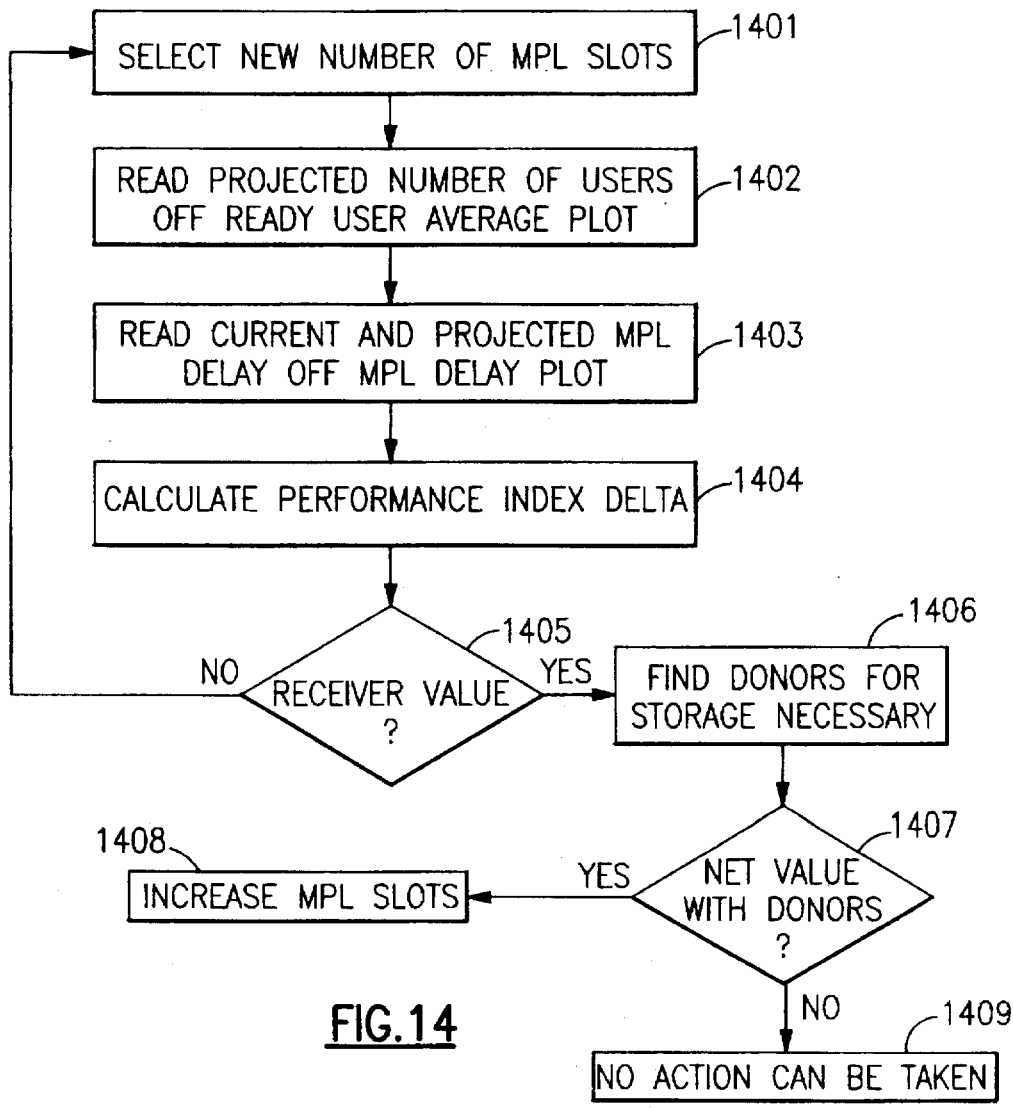
FIG. 14 is a flowchart of the steps to assess improving performance by increasing MPL slots.
Figure 15:
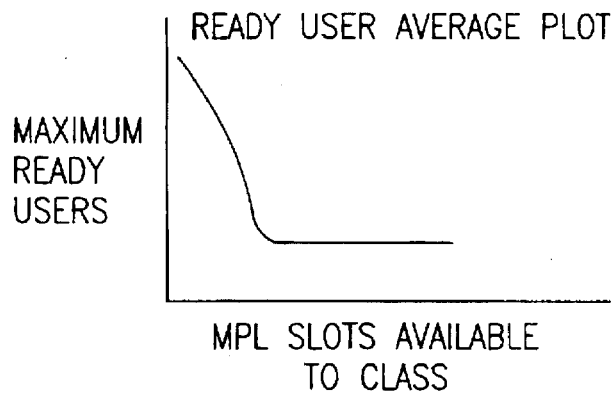
FIG. 15 is a sample graph of ready user average.
Figure 16:
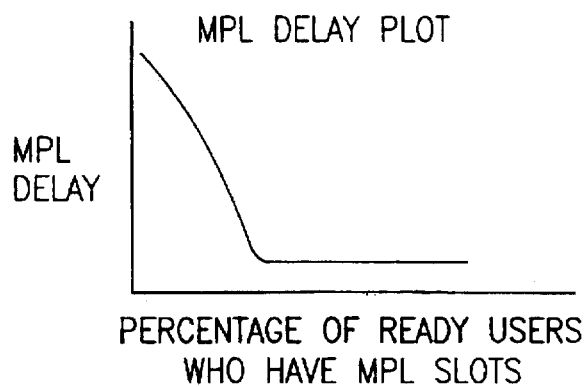
FIG. 16 is a sample graph of MPL delay.

FIG. 14 shows the logic flow to assess improving performance by increasing MPL slots. FIGS. 14–16 provide the steps involved in making the performance index delta projections provided by the fix means (118) to assess net value means (124). At (1401), a new number of MPL slots is selected to be assessed. The number must be large enough to result in sufficient receiver value to make the change worthwhile. Receiver value is checked at (1405). The number must not be so large that the value of the slots is marginal, for example, not more than three times the ready-user average.

At (1402), the projected number of ready users at the new number of MPL slots is read from the ready user average graph shown in FIG. 15. At (1403), the current and projected MPL delays are read from the MPL delay graph shown in FIG. 16. At (1404), the projected multi-system and local performance index deltas are calculated. These calculations are shown below.

At (1405), a check is made for sufficient receiver value provided by the additional number of MPL slots. If there is not sufficient receiver value, control returns to (1401) where a larger number of slots is selected to be assessed. If there is sufficient receiver value, at (1406), select donor means is called to find donors for the storage needed to give the additional MPL slots to the receiver performance goal class. At (1407), a check is made to ensure there is net value in taking storage from the donors to increase the receiver class MPL slots. If there is net value, the slots are given to the receiver at (1408); otherwise, the receiver goal class MPL delay problem cannot be solved (1409).

READY USER AVERAGE GRAPH

FIG. 15 illustrates the ready user average graph. The ready user average graph is used to predict the number of ready users when assessing an MPL target change. The graph can show the point at which work units will start backing up. The abscissa value is the number of MPL slots available to the service class period. The ordinate value is the maximum number of ready users.

MPL DELAY GRAPH

FIG. 16 illustrates the MPL delay graph. The MPL delay graph is used to assess the value of increasing or decreasing MPL targets for a performance goal class. The graph shows how response time may be improved by increasing MPL slots or how response time may be degraded by reducing MPL slots. The abscissa value is the percentage of ready work units that have an MPL slot available. The ordinate value is the MPL delay per completion.

MPL PERFORMANCE INDEX DELTA

Performance index deltas for MPL increases are calculated as follows:

For response time goals:

$$(\text{local performance index delta}) = \frac{(\text{projected } MPL \text{ delay}) - (\text{current } MPL \text{ delay})}{(\text{response time goal})}$$

$$(\text{projected multi-system performance index delta}) = \frac{(\# \text{ of local completions}) \times (\text{proj local performance index delta})}{(\# \text{ of total completions in the multi-system})}$$

For execution velocity goals:

$$(\text{new\_local\_velocity}) = \frac{(cpuu) + ((cpuu)/(avg\text{-}in))}{(non\text{-}idle) + ((cpuu)/(avg\_in)) - ((mpld)/(avg\_outr))}$$

$$(\text{local pi\_delta}) = (\text{current\_local\_pi}) - ((\text{goal})/(\text{new\_local\_velocity}))$$

where
CPUU is the local CPU-using samples.
CPUD is the local CPU-delay samples.
MPLD is the local MPL-delay samples.
Non-idle is the total number of local non-idle samples.
Avg_in is the average number of swapped-in address spaces.

Avg_outr is the average number of swapped-out address spaces that are ready to run.

The formulas for the multi-system velocity performance index delta are similar except the sample values are totals across all the systems being managed rather than the local system.

Similar calculations are used to calculate performance index deltas for MPL decreases.

SWAP DELAY

Figure 17:
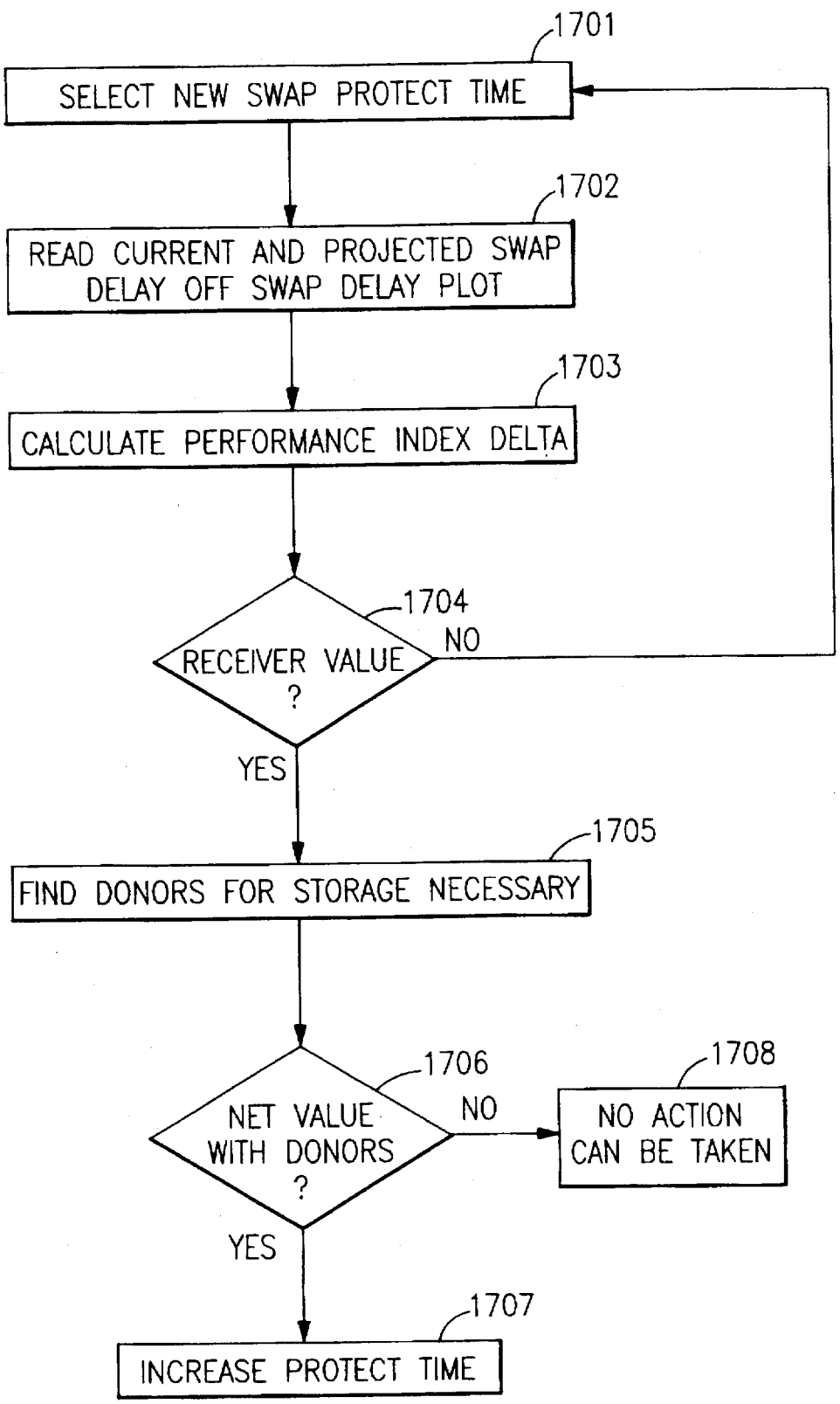
FIG. 17 is a flow chart showing the steps to assess improving a receiver's performance by increasing its swap protect time target.

This section describes improving performance by reducing the auxiliary storage swap delay (130) experienced by the receiver performance goal class. FIGS. 17–18 provide the steps involved in making the performance index delta projections provided by the fix means (118) to the assess net value means (124).

ASSESS SWAP PROTECT TIME CHANGES

FIG. 17 illustrates the steps to assess improving a receiver's performance by increasing its swap protect time target (132). At (1701) a new swap protect time is selected to be assessed. The new protect time must not be so large that its value is marginal, for example, not more than the longest time an address space has been swapped into processor storage in the last hour.

At (1702) the current and projected swap delays are obtained from the swap delay graph data, illustrated in FIG. 18. At (1703), the projected multi-system and local performance index delta is calculated. This calculation is done in much the same way as for the MPL fix means described above.

At (1704) there is a check for sufficient receiver value for the increased swap protect time. If there is not sufficient receiver value, control returns to (1701) where a larger swap protect time is selected to be assessed.

At (1705), the amount of storage necessary to the increase the swap protect time for the performance goal class is calculated, and the select donor means is called to find donor(s) for the required amount of storage. At (1706) a check is made to ensure that there is net value in taking storage from the donor(s) to increase the receiver performance goal class swap protect time. If there is net value, the receiver's swap protect time is increased at (1707). If there is not net value, no action is taken at (1708).

SWAP DELAY GRAPH

FIG. 18 illustrates the swap delay graph. The swap delay graph is used to assess increasing or decreasing a swap protect time target. The graph shows how response time may be improved by increasing swap protect time or how response time may degraded by reducing swap protect time. Both the abscissa and ordinate values are in milliseconds.

AUXILIARY STORAGE PAGING DELAY

Figure 19:
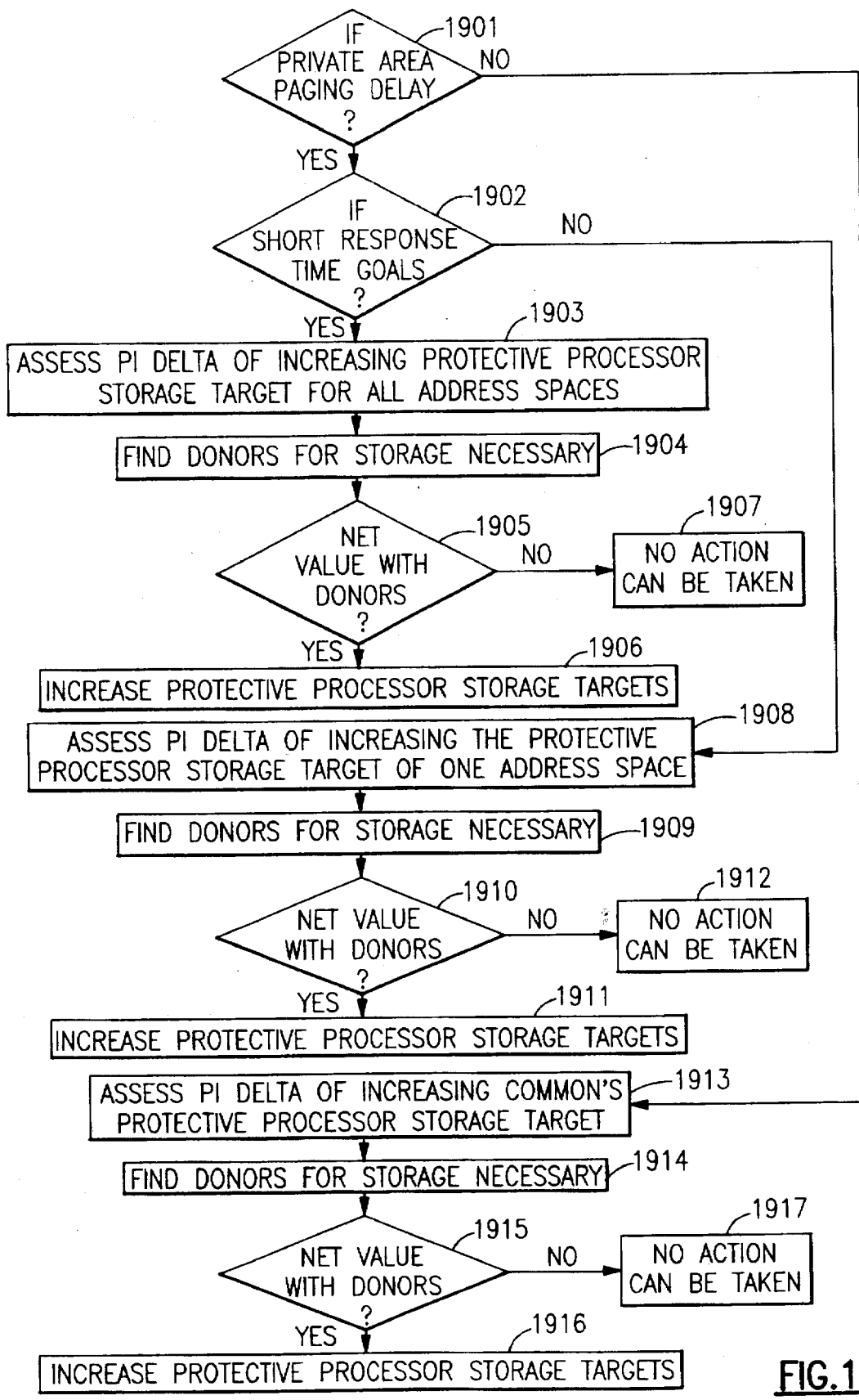
FIG. 19 is a flow chart showing the steps to take to reduce a receivers auxiliary storage paging delay.

This section describes improving performance by reducing the auxiliary storage paging delay (131) experienced by the receiver performance goal class. FIG. 19 provides the steps involved in making the performance index delta projections provided by the fix means (118) to Assess Net Value (124).

AUXILIARY STORAGE PAGING FIX ROUTINE

FIG. 19 illustrates the steps to take to reduce a receiver's auxiliary storage paging delay. At (1901) the type of delay is checked. If the delay type is private area auxiliary storage paging delay, control passes to (1902) where the type of performance goal is checked. For performance goal classes with response time that are less than 20 seconds, the auxiliary storage paging delay is addressed by giving every address space the same protective processor storage target. The effect on the multi-system and local performance indexes of increasing the protective processor storage target for all the address spaces associated with the respective performance goal class is calculated (1903). This calculation is done in much the same way as the other fix means. The target will be increased enough so there is sufficient receiver value in the action. At (1904), the select donor means is called to find donor(s) for the necessary storage. At (1905), a check is made to determine whether there is net value in the action. If there is net value, the targets are increased at (1906). If there is not net value, no action is taken at (1907).

Control is passed to (1908) for private area paging delay when the performance goal type is not a short response time goal, and the protective processor storage target of a single address space is increased. The multi-system and local performance index deltas are calculated for increasing one address space's protective processor storage target. At (1909), the select donor means is called to find donor(s) for the necessary storage. At (1910) a check is made to determine whether there is net value in the action. If there is net value, the target is increased at (1911). If there is not net value, no action is taken at (1912).

Control is passed to (1913) if the delay type is for auxiliary storage common paging delays and the performance index delta is calculated for increasing common's protective processor storage target. At (1914), the select donor means is called to find donor(s) for the necessary storage. At (1915) a check is made to determine whether there is net value in the action. If there is net value, the target is increased at (1916). If there is not net value, no action is taken at (1917). Cross memory, VIO and hiperspace delays are processed in a similar fashion.

Upon a reading of the present disclosure, it will be apparent to the skilled artisan that other embodiments of the present invention beyond those embodiments specifically described herein may be made or practiced without departing from the spirit of the invention. It will also will be clear to the skilled artisan that numerous equivalent elements may be substituted for elements expressly disclosed herein as a part of a functional limitation described or claimed in means-for terms. Similarly, changes, combinations and modifications of the presently disclosed embodiments will also become apparent. The embodiments disclosed and the details thereof are intended to teach the practice of the invention and are intended to be illustrative and not limiting. Accordingly, such apparent but undisclosed changes, combinations, and modifications are considered to be within the spirit and scope of the present invention.

What we claim as new is:

1. Apparatus for managing a workload comprising work units distributed across a plurality of data processing systems in accordance with a common performance standard, said common performance standard comprising at least one user specified performance goal, each of said systems having access to a stored representation of said performance standard and performing assigned work units in accordance with one or more system control parameters, said apparatus comprising, on each of said systems:

a) means for measuring performance goal achievement of the work units on said system to create local performance goal achievement data;

b) means for sending said local performance goal achievement data to at least one other system in said plurality of systems;

c) means for receiving performance goal achievement data from at least one other system in said plurality of systems to create remote performance goal achievement data; and d) means responsive to said local and remote performance goal achievement data for adjusting at least one of said system control parameters to modify the performance of said work units on said system to achieve said common performance standard.

2. The apparatus of claim 1 in which said performance standard comprises a common set of user specified performance goals of distinct types, said work units being organized into classes, each of which has a performance goal of one of said types.

3. A method for managing a workload comprising work units distributed across a plurality of data processing systems in accordance with a common performance standard, said common performance standard comprising at least one user specified performance goal, each of said systems having access to a stored representation of said performance standard and performing assigned work units in accordance with one or more system control parameters, said method comprising the steps, performed on each of said systems, of:

a) measuring performance goal achievement of the work units on said system to create local performance goal achievement data;

b) sending said local performance goal achievement data to at least one other system in said plurality of systems;

c) receiving performance goal achievement data from at least one other system in said plurality of systems to create remote performance goal achievement data; and d) adjusting at least one of said system control parameters in response to said local and remote performance goal achievement data to modify the performance of said work units on said system to achieve said common performance standard.

4. The method of claim 3 in which said performance standard comprises a common set of user specified performance goals of distinct types, said work units being organized into classes, each of which has a performance goal of one of said types.

5. An apparatus for managing a distributed data processing system workload having a common set of user specified performance goals across a plurality of independent and cooperating data processing systems according to one or more distinct performance goal types, said data processing system workload comprising work units organized into one or more performance goal classes, each of said classes having a performance goal from said common set of performance goals falling into one of said performance goal types, each of said data processing systems having access to a stored representation of said user specified performance goals and said apparatus comprising, on each of said data processing systems, a) workload manager means for accessing said common set of user specified performance goals and creating system control data within a class table means for defining said performance goal classes; and b) system resource manager means for managing system resources according to said common set of performance goals, said system resource manager means comprising:

i) sampler means for sampling states of said work units and creating sample data representative of local performance goal achievement;

ii) send data means for sending local performance goal achievement data to at least one other system in said plurality of data processing systems;

iii) remote data receiver means for receiving performance goal achievement data from at least one other system in said plurality of data processing systems; and iv) multi-system goal driven performance controller means responsive to said sample data, said performance goal achievement data from said at least one other system and said system control data for adjusting at least one system control parameter to cause a change to the performance of said work units to achieve said common set of performance goals.

6. The apparatus of claim 5 in which said class table means further comprises at least one importance parameter assigning a relative importance of a performance goal from said common set of performance goals.

7. The apparatus of claim 5 in which said one or more goal types comprise response time.

8. The apparatus of claim 5 in which said one or more goal types comprise execution velocity.

9. The apparatus of claim 5 in which said multi-system goal driven performance controller means comprises:

a) multi-system performance index calculation means for calculating a multi-system performance index for each of said goal classes across said plurality of data processing systems;

b) local performance index calculation means for calculating a local performance index for each of said goal classes;

c) select receiver means responsive to said calculated multi-system performance indexes and said calculated local performance indexes for selecting a receiver class to be accorded improved service;

d) find bottleneck means responsive to said sample data for identifying a system resource bottleneck affecting said selected receiver class; and e) fix means for adjusting said system control parameters, said fix means comprising at least one parameter adjustment means, each of said parameter adjustment means being responsive to said identification of an associated system resource bottleneck by said find bottleneck means and adjusting a particular system control parameter associated with said associated system resource bottleneck.

10. The apparatus of claim 6 in which said multi-system goal driven performance controller means comprises:

a) multi-system performance index calculation means for calculating a multi-system performance index for each of said goal classes across said plurality of data processing systems;

b) local performance index calculation means for calculating a local performance index for each of said goal classes;

c) select receiver means for selecting a receiver class to be accorded improved service, said select receiver means responsive to said calculated multi-system performance indexes, said calculated local performance indexes and said at least one importance parameter;

d) find bottleneck means for identifying a system resource bottleneck affecting said selected receiver class, said find bottleneck means being responsive to said sample data; and e) fix means for adjusting said system control parameters, said fix means comprising at least one parameter adjustment means, each of said parameter adjustment means being responsive to said identification of an associated system resource bottleneck by said find bottleneck means and adjusting a particular system control parameter associated with said associated system resource bottleneck.

11. The apparatus of claim 9 in which said multi-system goal driven performance controller means further comprises assess net value means, responsive to said fix means, for assessing the net effect on performance of a possible change to said particular system control parameter and indicating said net effect to said fix means.

12. The apparatus of claim 9 in which said multi-system goal driven performance controller means further comprises assess net value means, responsive to said fix means, for assessing the net effect on performance of a possible change to said particular system control parameter by using said multi-system performance index and indicating said net effect to said fix means.

13. The apparatus of claim 9 in which said multi-system goal driven performance controller means further comprises assess net value means, responsive to said fix means, for assessing the net effect on performance of a possible change to said particular system control parameter by using said multi-system performance index and said local system performance index and indicating said net effect to said fix means.

14. The apparatus of claim 9 in which said multi-system goal driven performance controller means further comprises select donor means, responsive to said fix means, for selecting a donor class to be accorded degraded service in favor of said selected receiver class.

15. The apparatus of claim 9 in which said system resource bottleneck is identified by said find bottleneck means to be a CPU bottleneck, and in which said fix means comprises adjust dispatch priority means for adjusting donor class dispatch priority and receiver class dispatch priority in response to said identifying of said CPU bottleneck.

16. The apparatus of claim 9 in which said system resource bottleneck is identified by said find bottleneck means to be a multi-program level delay, and in which said fix means comprises increase multi-program level slot means for increasing an multi-program level slot total in response to said identifying of said multi-program level delay.

17. The apparatus of claim 9 in which said system resource bottleneck is identified by said find bottleneck means to be an auxiliary storage swap delay, and in which said fix means comprises protect means for increasing swap protect time for said receiver class.

18. The apparatus of claim 9 in which said system resource bottleneck is identified by said find bottleneck means to be an auxiliary storage paging delay, and in which said fix means comprises increase target means for increasing a storage target in response to said identifying by said find bottleneck means.

19. The apparatus of claim 9 in which said fix means further comprises project multi-system and local performance indexes means for projecting effects of dispatching priority changes on said multi-system and local performance indexes of said donor class and said receiver class.

20. The apparatus of claim 9 in which said fix means further comprises project multi-system and local performance index means for projecting effects of multi-program level slot changes on said multi-system and local performance indexes of said donor class and said receiver class.

21. The apparatus of claim 9 in which said fix means further comprises project multi-system and local performance index means for projecting effects of swap delay changes on said multi-system and local performance indexes of said donor class and said receiver class.

22. The apparatus of claim 9 in which said fix means further comprises project multi-system and local performance index means for projecting effects of auxiliary storage paging delay changes on said multi-system and local performance indexes of said donor class and said receiver class.

23. The apparatus of claim 9 in which said system resource bottleneck is identified by said find bottleneck means to be a CPU bottleneck, and in which said fix means comprises adjust dispatch priority means for adjusting donor class dispatch priority in response to said identifying of said CPU bottleneck.

24. The apparatus of claim 9 in which said system resource bottleneck is identified by said find bottleneck means to be a CPU bottleneck, and in which said fix means comprises adjust dispatch priority means for adjusting receiver class dispatch priority in response to said identifying of said CPU bottleneck.

25. A method for managing a distributed data processing system workload having a common set of user specified performance goals across a plurality of independent and cooperating data processing systems according to one or more distinct performance goals type, said data processing system workload comprising work units organized into one or more performance goals classes, each of said classes having a performance goal from said common set of user specified performance goals falling into one of said performance goal types, each of said data processing systems comprising a stored representation of said common set of performance goals and said method comprising the steps of:
   a) accessing said common set of user specified performance goals by each system and creating system control data; and
   b) managing system resources according to said common set of performance goals by:
      i) periodically sampling states of said work units and creating sample data representative of local performance goal achievement;
      ii) sending performance goal achievement data to at least one system in said plurality of data processing system;
      iii) receiving performance goal achievement data from at least one system in said plurality of data processing systems;
      iv) adjusting at least one system control parameter in response to said sample data and said system control data to change the performance of said work units so as to achieve said common set of performance goals for said particular ones of said work units.

26. The method of claim 25 in which said system control data comprises at least one importance parameter assigning a relative importance to a performance goal from said common set of performance goals.

27. The method of claim 25 in which said work units are organized into a plurality of performance goal classes, said step of adjusting comprising the steps of:
   a) calculating a multi-system performance index for each of said classes across said plurality of data processing systems;
   b) calculating a local performance index for each of said classes;
   c) selecting a receiver class from said plurality of performance goal classes to be accorded improved service, in response to said calculated multi-system and local performance indexes;
   d) in response to said sample data, identifying a system resource bottleneck affecting said selected receiver class; and
   e) adjusting one or more of said system control parameters in response to said identifying said system resource bottleneck, said one or more system control parameters being associated with said identified system resource bottleneck.

28. The method of claim 27 in which said work units are organized into a plurality of performance goal classes, said step of adjusting comprising the steps of:
   a) calculating a multi-system performance index for each of said classes across said plurality of data processing systems;
   b) calculating a local performance index for each of said classes;
   c) selecting a receiver class from said plurality of performance goal classes to be accorded improved service, in response to said calculated multi-system performance indexes, said calculated local performance indexes and said at least one importance parameter;
   d) in response to said sample data, identifying a system resource bottleneck affecting said selected receiver class; and
   e) adjusting one or more of said system control parameters in response to said identifying said system resource bottleneck, said one or more system control parameters being associated with said identified system resource bottleneck.

29. The method of claim 27 in which said step of calculating multi-system performance index comprising the steps of
   a) determining whether a goal class has a response time goal;
   b) if said class has said response time goal:
      i) obtaining multi-system response time data;
      ii) obtaining local response time data; and
      iii) from said multi-system response time data and said local response time data, determining multi-system performance indexes;
   c) determining whether a goal class has an execution velocity goal; and
   d) if said goal class has said execution velocity goal:
      i) obtaining multi-system velocity data;
      ii) obtaining local velocity data; and
      iii) from said multi-system velocity data and said local velocity data, determining multi-system performance indexes.

30. The method of claim 29 further comprising the step of selecting a donor class to be accorded degraded service in favor of said receiver class.

31. The method of claim 27 further comprising the step of assessing the net effect on performance of a possible change to said one or more system control parameters prior to said adjusting.

32. The method of claim 27 in which said step of identifying a system resource bottleneck identifies a CPU bottleneck, and in which said at least one system control parameter is a dispatching priority parameter associated with said donor class and said receiver class.

33. The method of claim 27 in which said step of identifying a system resource bottleneck identifies a multi-program level delay, and in which said at least one system control parameter is a multi-program level slot which is added, by said step of adjusting, in response to said step of identifying.

34. The method of claim 27 in which said step of identifying a system resource bottleneck identifies an auxiliary storage swap delay, and in which said at least one or more system control parameter is a swap protect time parameter which is increased for said receiver class in response to said step of identifying.

35. The method of claim 27 in which said step of identifying a system resource bottleneck identifies an auxiliary storage paging delay, and in which said at least one system control parameter is a storage target which is increased for said receiver class in response to said step of identifying.

36. The method of claim 27 in which said step of adjusting comprises the step of projecting effects of dispatching priority changes on said multi-system and local performance indexes of said donor class and said receiver class.

37. The method of claim 27 in which said step of adjusting comprises the step of projecting effects of multi-program level slot changes on said multi-system and local performance indexes of said donor class and said receiver class.

38. The method of claim 27 in which said step of adjusting comprises the step of projecting effects of swap delay changes on said multi-system and local performance indexes of said donor class and said receiver class.

39. The method of claim 27 in which said step of adjusting comprises the step of projecting effects of auxiliary storage paging delay changes on said multi-system and local performance indexes of said donor class and said receiver class.

40. The method of claim 27 in which said step of identifying a system resource bottleneck identifies a CPU bottleneck, and in which said at least one system control parameter is a dispatching priority parameter associated with said donor class.

41. The method of claim 27 in which said step of identifying a system resource bottleneck identifies a CPU bottleneck, and in which said at least one system control parameter is a dispatching priority parameter associated with said receiver class.

42. A method for obtaining multi-system performance goal achievement indexes of user specified performance goals for a distributed data processing system workload comprising the steps of:

a) determining if a goal class has a user specified response time goal;

b) if said class has said response time goal:
   i) obtaining multi-system response time data;
   ii) obtaining local response time data; and
   iii) from multi-system response time data and local response time data determining multi-system performance indexes; and c) determining whether a goal class has a user specified execution velocity goal;

d) if said goal class has said execution velocity goal:
   i) obtaining multi-system velocity data;
   ii) obtaining local velocity data; and
   iii) from said multi-system velocity data and said local velocity data, determining multi-system performance goal achievement indexes.

* * * * *